(12) United States Patent
Halme et al.

(10) Patent No.: US 7,280,540 B2
(45) Date of Patent: Oct. 9, 2007

(54) PROCESSING OF DATA PACKETS WITHIN A NETWORK ELEMENT CLUSTER

(75) Inventors: Matti Halme, Turku (FI); Esa Harjulahti, Turku (FI); Tommi Virtanen, Turku (FI); Timo Virtanen, Turku (FI); Tuomo Syvanne, Vantaa (FI)

(73) Assignee: Stonesoft Oy, Helsinki (FI)

( * ) Notice: Subject to any disclaimer, the term of this patent is extended or adjusted under 35 U.S.C. 154(b) by 991 days.

(21) Appl. No.: 10/013,613

(22) Filed: Oct. 19, 2001

(65) Prior Publication Data

US 2002/0097724 A1 Jul. 25, 2002

(30) Foreign Application Priority Data

Jan. 9, 2001 (FI) .................................. 20010034
Mar. 15, 2001 (FI) .................................. 20010521

(51) Int. Cl.
*H04L 12/56* (2006.01)
(52) U.S. Cl. ................. 370/392; 370/401; 713/150; 713/153
(58) Field of Classification Search ........... 370/392, 370/389, 401; 713/190, 150, 153, 154
See application file for complete search history.

(56) References Cited

U.S. PATENT DOCUMENTS

| | | | | |
|---|---|---|---|---|
| 5,473,607 A | * | 12/1995 | Hausman et al. | ........... 370/392 |
| 5,852,607 A | * | 12/1998 | Chin | ........................... 370/401 |
| 6,006,259 A | | 12/1999 | Adelman et al. | ........... 709/223 |
| 6,018,526 A | * | 1/2000 | Liu et al. | ..................... 370/401 |
| 6,442,617 B1 | * | 8/2002 | Lowe et al. | ................. 709/250 |
| 6,453,360 B1 | * | 9/2002 | Muller et al. | ................ 709/250 |
| 6,636,520 B1 | * | 10/2003 | Jason et al. | ................. 370/401 |
| 6,651,099 B1 | * | 11/2003 | Dietz et al. | ................. 709/224 |

(Continued)

FOREIGN PATENT DOCUMENTS

EP 0 865 180 A2 9/1998

(Continued)

OTHER PUBLICATIONS

Alteon Websystems: "Virtual Matrix Architecture: Scaling Web Services for Performance and Capacity" White Page, Apr. 2000, XP002191242, Retrieved from Internet: URL:http://www.nortelnetworks.com/products/library/collateral/intel_int/yma_white_paretrieved Feb. 22, 2002.

*Primary Examiner*—Firmin Backer
*Assistant Examiner*—Nguyen Ngo
(74) *Attorney, Agent, or Firm*—Ronald C. Fish, A Law Corp.

(57) ABSTRACT

In a network element cluster having a plurality of nodes, distribution decisions are determined on the basis of certain field(s) of data packets according to predetermined criteria, and data packets are distributed to nodes of the network element cluster according to the distribution decisions. Data packets are processed by said nodes of the network element cluster, and the processing involves selecting at least partly arbitrary value(s) for at least one of the field(s) of at least one data packet. Such value(s) are selected for at least one of said certain field(s) of a third data packet, such that distribution decisions determined according to the predetermined criteria result in the same node in the cluster processing inbound and outbound packets of the same session ID.

12 Claims, 9 Drawing Sheets

U.S. PATENT DOCUMENTS

| | | | |
|---|---|---|---|
| 6,772,226 B1* | 8/2004 | Bommareddy et al. | 709/245 |
| 6,779,039 B1* | 8/2004 | Bommareddy et al. | 709/238 |
| 2002/0048269 A1* | 4/2002 | Hong et al. | 370/389 |
| 2002/0196796 A1* | 12/2002 | Ambe et al. | 370/401 |
| 2003/0033543 A1* | 2/2003 | Hubbard et al. | 713/201 |

FOREIGN PATENT DOCUMENTS

| | | |
|---|---|---|
| WO | WO-A-0031945 | 6/2000 |
| WO | WO-A-0052881 | 9/2000 |
| WO | WO-A-0062502 | 10/2000 |

* cited by examiner

PROCESSING OF DATA PACKETS WITHIN A NETWORK ELEMENT CLUSTER

BACKGROUND OF THE INVENTION

1. Field of the Invention

The invention relates to methods for distributing data packets of communication connections to nodes in network element clusters and to network element clusters, where such methods are applied. Especially, the invention is related to such a method as specified in the preamble of the independent method claim.

2. Description of Related Art

The public networks are presently being used more and more for sensitive and mission critical communications and the internal networks of various organisations and enterprises are nowadays connected to the public networks, Internet being one of them. Since the basic mechanisms of the public networks were originally not designed with secrecy and confidentiality in mind, public networks are untrusted networks. To protect an internal network, a special network element is usually used to connect the internal network to a public network. Typically such network element monitors the connections traversing the network element and possibly modifies the data packets of the connections according to predetermined rules. Methods such as network address translation (NAT) and protocol conversions are methods requiring that the data packets are modified in such network elements. Also other modifications on the data packets traversing the network element may be performed. This kind of network element is often called a security gateway or a firewall.

The above described security gateway may consist of several similar security gateway (=nodes), i.e. it may be a security gateway cluster. The nodes of a cluster serve as backup nodes to each other and the load handled by the cluster may be balanced between the nodes. The clustered structure increases availability and distributes the load, therefore reducing the probability of a downtime to nearly zero and increasing the throughput of the security gateway. FIG. 1 illustrates a configuration where there are 3 nodes A1, A2, and A3 in security gateway cluster CA and 5 nodes B1, B2, B3, B4, and B5 in security gateway cluster CB. Nodes A1, A2, and A3 connect the internal network A to the public network 10, and nodes B1, B2, B3, B4, and B5 connect the internal network B to the public network 10. In the structure of FIG. 1, each internal network is connected to the public network via only one Internet service provider (ISP). It is alternatively possible that each internal network is connected to the public network via a number of ISPs, however this issue is not addressed any further here.

Within a cluster all nodes may have an individual IP addresses or they may have a common IP address. Alternatively, nodes may have both a common IP address and an individual IP address. Typically nodes share a common IP address using which the cluster is addressed. In that case all nodes see all data packets arriving at the cluster and there has to be an arrangement for distinguishing which data packets belong to which node. That is, each node should process only those packets that are assigned to it and ignore other data packets. Therefore the data packets arriving at the cluster need to be distributed to different nodes of the cluster. Typically the nodes filter all arriving data packets and decide for example on the basis of the plaintext header field(s) of the packet whether that particular node needs to process that particular packet. Individual IP addresses may be used for e.g. node dedicated control traffic.

It is advantageous that the same node that processes outbound data packets (i.e. packets received from the internal network) processes also the inbound data packets (i.e. packets received from the public network) related to the same connection. In other words, it is advantageous that one node processes all data packets of one connection. In fact, if all packets of a connection are not handled by the same node, the connection typically fails, unless processing of the connection is properly transferred from one node to another. Transferring the connections is however beyond the scope of this application and will not be addressed any further here.

A simple way to distribute data packets to nodes is to use information found in the plaintext header fields of the data packets for this purpose. It is common to use source and destination addresses and ports of data packets. A data packet is here referred to as (source address, source port, destination address, destination port). Consider for example a client C1 with address 10.1.1.10 in the internal network A of FIG. 1 connecting to a server S with address 1.1.1.1 in the public network 10. An outbound data packet (10.1.1.10, X, 1.1.1.1, Y) from the client C arrives at the cluster CA. On the basis of the addresses 10.1.1.10 and 1.1.1.1 the data packet (10.1.1.10, X, 1.1.1.1, Y) is processed by node A1. It may have been decided that all data packets between these endpoints are processed by the node A1 or the decision may be based on some function calculated on the addresses 10.1.1.10 and 1.1.1.1 and ports X and Y. If the node A1 does not alter the addresses of the data packet, it is straightforward to map also the inbound reply packets (1.1.1.1, Y, 10.1.1.10, X) of the same connection to the node A1. It is clear that in this case it is easy to assign a connection between another client C2 with address 10.1.1.11 in the internal network A and the same server S or a connection between some port Z of the client C1 and the port Y of the server S to some other node than node A1. This is advantageous especially, if there are several connections from several sources to the same server, which is usually the case with e.g. popular web servers.

The above situation is different, if the node A1 does alter the addresses of the data packet. Consider for example NAT. One well known way to employ NAT is to hide all addresses of an internal network behind one (or more) address(es). In this case, lets assume that there is a NAT rule according to which the addresses of the internal network A are replaced by address 192.98.99.65 in the nodes A1, A2 and A3, and the source port is replaced by some suitable value for identifying the original source. This means that the outbound data packet (10.1.1.10, X, 1.1.1.1, Y) is modified to (192.98.99.65,R, 1.1.1.1, Y) resulting in inbound data packets (1.1.1.1, Y, 192.98.99.65, R). Now outbound data packets (10.1.1.10, X, 1.1.1.1, Y) and inbound data packets (1.1.1.1, Y, 192.98.99.65, R) have in common only the address 1.1.1.1 and the port Y of the server. In order to map inbound and outbound data packets of the same connection to the same node, all connections terminating at port Y at the server S need to be processed by the same node. If there are several such connections this is clearly not desirable, since it mitigates the possibilities to balance the load between the nodes.

It is also possible that inbound and outbound data packets of the same connection do not have anything in common in their plaintext header fields. For example, secure tunnels may be like this. Nevertheless, also in that case the data packets of one connection should be processed by the same node.

One widely used structure for secure communications is the virtual private network (VPN). A virtual private network is established on top of an untrusted network such as the Internet by constructing encrypted data transmission channels. A virtual private network is typically used to connect distant offices of an organization to each other over a public network. All traffic from the internal network of a first office directed to a second office is encrypted by a network element at the first office, sent in encrypted form over the public network to the second office, where a network element decrypts the transmitted data and forwards the decrypted data to the internal network of the second office. The network element performing the encryption is typically a security gateway. The VPN is typically transparent to the processes that are communicating between each other.

Virtual private networks are typically constructed using the IPSec protocol suite. The IPSec protocol suite is described in the standard RFC 2401 "Security Architecture for the Internet Protocol". IPSec offers access control, connectionless integrity, data origin authentication, protection against replays, confidentiality (encryption), and limited traffic flow confidentiality. The IPSec protocol suite provides an infrastructure for the data transmission and encryption processes, but does not define any specific encryption method. Many different kinds of encryption methods can be used for IPSec connections. Virtual private networks typically use so called tunnel mode, in which an entire data packet is encrypted, and the result is transmitted as a payload in another data packet. IPSec traffic is unidirectional. An IPSec tunnel, for example, consists of at least one pair of Security Associations.

A Security Association (SA) is a simplex logical connection that affords security services to the traffic carried by it. Security Associations are described in RFC 2401. In IPSec security services are afforded to a SA by the use of authentication header (AH, described in RFC 2402), or encyption of security payload (ESP, described in RFC 2406, but not both. If both AH and ESP protection is applied to a traffic stream using IPSec, then two (or more) SAs are created to afford protection to the traffic stream. To secure typical, bi-directional communication between two security gateways, two Security Associations (one in each direction) are required. Between security gateways the Security Associations are tunnel mode associations. This means that a secured data packet (which is secured with AH or ESP) is encapsulated within an outer data packet having plaintext headers. The plaintext header indicate, for example, the source and destination security gateways.

The security gateway providing VPN functionality may be clustered. The number of nodes may be different at different endpoints of the VPN. Clustering may also be applied to one endpoint of a VPN only.

Usually each node in a cluster is responsible for handling certain connections. It is possible, for example, that an IPSec tunnel is established between a specific node of a first cluster and a specific node of a second cluster, for example between A2 and B4 in FIG. 1. Alternatively, in the other endpoint there may be only one security gateway instead of a cluster. If a specific node of a cluster is an endpoint of an IPSec tunnel, the other endpoint of the IPSec tunnel knows the IP address of the node in the cluster. This may be a problem, for example, when that specific node is overloaded or crashes. It is not possible to change an IPSec tunnel from one endpoint to another; a new tunnel has to be set up instead.

Typically an IP header of a packet received from the internal network is in plaintext and a node which processes an outbound data packet can be determined using a plaintext data packet header. If the IP headers of both the inbound and outbound data packets were plaintext, it would be easy to direct the inbound packets to the same node that processed the outbound packets as was explained in the above description. The problem here is that the inbound IP packet is typically an IP packet, in which an encrypted IP packet is encapsulated. Information about the IP header of the encapsulated, encrypted packet is needed in selecting the correct node. This IP header is, however, typically encrypted. The plaintext IP header of the inbound data packet indicates the address of the cluster and the other endpoint of the VPN, instead of the addresses of the actual source and destination endpoints. One solution is that each node decrypts each inbound data packet, and decides only thereafter if the packet belongs to it or not. Decrypting each inbound data packet header in each node is a waste of resources, and this solution is not feasible in practice.

Also other network elements may be clustered in the similar way to the security gateways. One example of such network elements is a web server. The load of a busy server may be balanced between a plurality of nodes of a server cluster. Typically the nodes have a common IP address, and the server cluster seems to be one single server to the clients.

In the case of web servers there is no problem in distributing the data packets of the same connection since a server is an end point of the connections. Nevertheless, it is advantageous that all connections relating to the same communication session between one client and the server cluster are processed by the same server node. The first connection of a communication session may be directed to any one of the nodes, but it is desirable, that all subsequent connections relating to the same communication session are directed to the same node, which processed the first connection. For the sake of consistency within the text, here the term inbound data packet refers to a data packet received at a server from the network the server cluster is connected to and the term outbound data packet refers to a data packet sent from the server cluster to the network the server cluster is connected to.

SSL (Secure Sockets Layer) protocol is a well known security protocol, which provides communications privacy over public networks. The protocol allows clients and servers to communicate in away that is designed to prevent eavesdropping, tampering, or message forgery. When an SSL client and server first start to communicate, they select cryptographic algorithms, optionally authenticate each other, and use public-key encryption techniques to generate shared secrets. These processes are performed in SSL handshake protocol, which includes exchanging a plurality of messages between the client and the server and establishing a Session ID. A Session ID is an arbitrary byte sequence chosen by the server to identify an active or resumable communication session. After the handshake is complete, the client and the server may start to transfer actual data. When the client and the server decide to open another connection relating to an already opened communication session, resume a previous communication session or to duplicate an existing communication session, i.e. not to negotiate new security parameters, the connection can be accepted and old security parameters can be taken into use by means of the Session ID of the communication session.

In a server cluster, all connections relating to the same Session ID need to be processed by the same server node. The first connection may be arbitrarily directed to one of the nodes, but the subsequent connections of the same communication session need to be directed to the same node. One way to do this is to inspect inbound and outbound data packets in order to find out the Session ID that is established during the handshake phase. Then knowledge of the Session ID and of the corresponding node processing the connection is stored. On the basis of this knowledge an inbound data packet containing a Session ID can be directed to the node processing corresponding communication session. The disadvantage in this method is that outbound data packets need to be inspected. Further, the knowledge (Session ID) needed for distributing data packets correctly can be obtained only during the handshake phase.

HTTP (HyperText Transfer Protocol) cookies are widely used in conjunction with web-based client-server connections. A server, when returning an HTTP object to a client in response to a client request, may also send a piece of state information which the client will store. Included in that state object is a description of the range of URLs (Uniform Resource Locators) for which that state is valid. Any future HTTP requests made by the client, which fall in that range will include a transmittal of the current value of the state object from the client back to the server. The state object is called an HTTP cookie. Connections belonging to the same communication session may be identified by means of an HTTP cookie in a similar manner to the SSL Session ID.

There is thus a problem in distributing inbound data packets belonging to a certain communication connection or session to the same node of a network element cluster, which processes outbound data packets belonging to said communication connection or session. Furthermore, there is a problem of how to flexibly share and balance load relating to the communication connections or sessions between the nodes of a network element cluster, the network elements being for example security gateways or servers.

SUMMARY OF THE INVENTION

An object of the invention is to realize a flexible method for distributing data packets to nodes of a network element cluster, the data packet belonging to sets of data packets and sets referring to for example communication connections or sessions. A further object is to realize a method, which allows flexible load sharing and balancing between the nodes of a network element cluster. A further object is to present a node of a network element cluster and a network element cluster, where flexible load balancing and load sharing is possible.

The invention is characterized by that which is specified in the appended independent claims. The appended dependent claims describe some preferred embodiments of the invention. The features described in one dependent claim may be further combined with features described in another dependent claim to produce further embodiments of the invention.

Generally, the invention is based on the idea of a "clustering aware network element". Until nowadays, typical security gateways and servers have been designed to operate merely as single nodes, and clustering functionality has been provided by an additional third party process. Therefore, the clustering processes have been forced to adapt to the features of the network elements to be clustered. According to the invention, the network element to be clustered adapts either implicitly or explicitly to the features of the clustering process. Adapting implicitly refers to a situation where the network element provides information for the clustering process and adapting explicitly refers to a situation where some decisions within the network element are based on the clustering requirements. The clustering process may be either a separate, centralized process or an integrated part of the network element itself. The latter is a distributed solution in which all network elements include clustering functionality. Additionally it is possible, that only some portion of the clustering process is an integrated part of the network element itself and the rest is implemented as a separate process or device.

According to the invention distribution decisions are first determined according to predetermined criteria on the basis of certain field(s), which may be data-packet-type specific, of data packets, and data packets are distributed to nodes of a network element cluster according to the distribution decisions. Data packets are processed in respective nodes and the processing involves selecting at least partly arbitrary value(s) for at least one of the certain field(s) of at least one data packets. Such value(s) are selected for at least one of said certain field(s) of a third data packet, that distribution decisions determined according to the predetermined criteria for a plurality of first data packets and a plurality of second data packets are the same, said pluralities of first and second data packets belonging to a first set of data packets and said third data packet being related to said first set of data packets. This refers to the situation described above, where a network element adapts explicitly to the clustering process, i.e. selection of apparently arbitrary values is done on the basis of knowledge of the method to determine distribution decisions.

Additionally, it is possible to select at least partly arbitrary value(s) for at least one of said certain field(s) of a sixth data packet, thereby obtaining selected value(s), and then to adjust said predetermined criteria on the basis of the selected value(s) so that said a plurality of fourth data packets and a plurality of fifth data packets result in the same distribution decision, said pluralities of fourth and fifth data packets belonging to a second set of data packets and said sixth data packet being related to said second set of data packets. This on the other hand, refers to the situation described above, where a network element adapts implicitly to the clustering process, i.e. the selection of values is arbitrary and knowledge of the selected values is used for adjusting distribution decisions.

The above mentioned third data packet may be one of the first data packets, in which case said third data packet and said pluralities of first and second data packets are processed in the same node of the network element cluster. Another possibility is that the third data packet is processed in a first node of the network element cluster and said pluralities of first and second data packets are processed in a second node of the network element cluster. In that case the third data packet concerns for example establishing some values which affect said first and/or second data packets. The third data packet may be for example a data packet determining some parameters, which are used in a communication connection consisting of the first and the second data packets. Such parameters may include for example security parameters of an IPSec connection.

Accordingly, the sixth data packet may be one of the fourth data packets, in which case said sixth data packet and said pluralities of fourth and fifth data packets are processed in the same node of the network element cluster. Furthermore, the sixth data packet may be processed in a third node of the network element cluster and said pluralities of fourth and fifth data packets in a fourth node of the network element cluster.

Said pluralities of first and second data packets may be for example data packets of one communication connection, in which case said first and second data packets are typically destined to the opposite directions within the communication connection, i.e. they are respectively inbound and outbound data packets of one connection. Said pluralities of first and second data packets may also be data packets of a first and a second communication connection of one communication session. In general, said first and second data packets are data packets that need to be processed in the same network element.

It is possible to use various different fields of data packets for determining distribution decisions. Such fields include but are not limited to: the source address field and the destination address field of an Internet Protocol header, port header fields of a Transmission Control Protocol header, port header fields of a User Datagram Protocol header, the identifier header field of an Internet Control Message Protocol, the Security Parameter Index field of a security header relating to the IPSec protocol suite, a Message Identifier field of an Internet Security Association and Key Management Protocol header, an Initiator Cookie field of an Internet Security Association and Key Management Protocol header, a Session ID field relating to the Secure Sockets Layer protocol and an HTTP Cookie field relating to the HyperText Transfer Protocol. These fields are discussed in more detail later in this document.

Determining distribution decisions and distributing data packets may be implemented for example by means of hash function(s). Advantageously, to each node in a network element cluster is allocated a separate set of hash values, hash values are calculated for data packets using certain fields, which may be data-packet-type specific, of data packets, and data packets are distributed to nodes of the network element cluster according to the calculated hash values. Several different hash functions may be used, and the hash function to be used may be data-packet-type specific.

The term protocol suite for securing packet data communications in the appended claims and in the description refers to various protocols and protocol headers relating to securing packet data transmissions. An example of such protocol suite is the IPSec protocol suite, where of the Authentication Header, the Encapsulated Security Payload header and relating payload, and IKE protocol and relating ISAKMP protocol messages, for example, form a part. The IPSec protocol suite may be a separate protocol suite, as in the case of IPv4, or it may be a part of another protocol, as in the case of IPv6.

The term secure tunnel in the appended claims and in the description refers, for example, to an IPSec tunnel. The secure tunnel may be secured by providing means for checking authenticity of origin or by providing means for ensuring confidentiality of transmitted data. The term protocol for establishing a secure tunnel refers, for example, to the Internet Key Exchange Protocol Phase II. The term protocol for establishing secure key management sessions refers, for example, to the Internet Key Exchange Protocol Phase I. The term key management protocol refers, for example, to Internet Key Exchange Protocol.

Data packets, which are processed in a network element (cluster), typically comprise various plain text data packets. If the network element is a security gateway or similar device then data packets, which are processed, typically comprise additionally data packets of secure tunnels, and data packets relating to establishment of secure tunnels and to secure key exchange between security gateways. A security gateway (cluster) typically receives plain text data packets from an internal network and also via a public network, as typically all packet data communications passing a security gateway are not secured. The term data packet of a secure tunnel refers to a data packet carrying data to be protected using said secure tunnel. Such a data packet typically has some specific security headers or header fields. A security gateway (cluster) typically receives such data packets from a public network and after performing some checking operations and possible decoding transmits them further to an internal network.

The term inbound data packet refers here to a data packet, which a network element (cluster) receives from a public network. Term outbound data packet refers here to a data packet, which a network element (cluster) receives from an internal network. A network element (cluster) may perform operations, which secure an outbound data packet, before the outbound data packet is transmitted further. Some of the outbound data packets are typically transmitted further without securing them. In the case that the network element is the endpoint of a connection the term inbound data packet refers to a received data packet and the term outbound data packet refers to a sent data packet regardless of the type of the network the data packets are received from or sent to.

In the following, issues relating to securing data packets in a network element or security gateway are addressed further. In general, these issues do not relate to server clusters. The inbound data packets carry some plaintext header fields. The header structure and header fields may vary, and inbound data packets received by a network element (cluster) may include tunneled secured data packets, data packets relating to security negotiations between network elements (element clusters) and data packets relating to establishing a secure tunnel between two network elements (element clusters). Establishing a secure tunnel between network elements (element clusters) typically required that the network elements (element clusters) provide VPN functionality. The data packet fields, which are used in determining distribution decision concerning a specific data packet, typically depend on the type of the data packet or—on the header structure of the data packet, if header fields are used in determining distribution decisions.

Examples of inbound data packets are data packets relating to Internet Key Exchange (IKE) and data packets relating to an established IPSec tunnel. The IKE protocol has a Phase I, which is used to create an IKE Security Association (SA) between two IPSec capable devices. An IKE SA is used for IKE Phase II negotiations, which are used to create IPSec SAs between, for example, two network elements (or element clusters) providing VPN functionality.

In the following discussion relating to secured connections about the advantages of the invention and in describing the invention in more detail, IPSec protocol suite and IKE protocol are used as examples. Data packets relating IKE Phase I, IKE Phase II and data packet relating to an established IPSec tunnel carry plaintext header fields. The plaintext address fields indicate the endpoints of the tunnel, for example, network elements (element clusters) providing VPN functionality. In addition to these plaintext address fields there are further plaintext fields, the value of which does not change during a certain exchange of messages. Such an exchange of messages, which have at least some common plaintext header field values, is here called a communication session. IKE Phase I and IKE Phase II negotiation are examples of communication sessions, similarly as data packets relating to a certain IPSec tunnel are an example of a communication session.

The IKE protocol, for example, allows a receiving endpoint to select values for some of the plaintext header fields of data packets carrying traffic relating to IPSec tunnels. The values of some of these plaintext header fields do not change during a communication session. Therefore it is possible to select values for some plaintext header fields so that inbound data packets have such plaintext header field values that a hash calculated using at least the header field values results in the same value as a hash calculated using certain header fields in the outbound data packets. Considering secure communications, one advantage of the invention is therefore that it is possible to select such header field values for inbound data packets that those data packets are processed in the same node as outbound data packets to be secured by the same IPSec tunnel.

A further advantage of the invention is that when the methods for determining distribution decisions relating to the inbound and outbound data packets, are properly selected, the sets of data packets forming e.g. communication sessions or message exchanges (and the processing load relating to these sets of data packets) are distributed between the nodes in a network element cluster. Thus using a method according to the invention, load balancing between the nodes in a network element cluster is possible. Furthermore, determining distribution decisions on the basis of plaintext header fields and optionally hash functions is fast, so inbound and outbound data packets are processed in correct nodes without a need for, for example, decrypting encrypted packet headers.

Another advantage of the invention is that it is possible to distribute between the network element nodes the load relating to, for example, IKE Phase II negotiations by selecting suitable values for header fields in the IKE Phase II data packets. This way it is possible to control, which node is responsible for initiated IKE Phase II negotiations. A further advantage of the invention is that the IKE negotiations initiated by other network elements (or element clusters) providing VPN functionality, for example, are likely to be distributed between the nodes in a network element cluster as it is probable that the other network elements do not select such values for the header fields that the IKE Phase I or Phase II negotiations are all carried out by a single network element node.

If the other network element providing VPN functionality, for example, initiates IKE Phase I or IKE Phase II negotiations, the hash value calculated using the selected fields typically indicates a node which will process the IKE Phase I or IKE Phase II negotiations, if hash values are used for determining distribution decisions. It may happen that the node, which actually takes care of an IPSec tunnel, is not the same as which carries out the IKE Phase II negotiation relating to this IPSec tunnel. In this case, the node which will take care of a IPSec tunnel will be informed, for example, of the encryption keys and other parts of the security association that are negotiated for said IPSec tunnel.

If hash values are used for determining distribution decisions, the hash values that are allocated to each node may be changed dynamically, i.e. reallocated. For example, if the load of the nodes is not even enough, it is possible, for example, to reallocate some of the hash values of a node having largest load to node having less load. If a node goes down, it is also possible to reallocate the hash values originally allocated to this node for other nodes. This reallocation of hash values results in that data packets relating to a certain IPSec tunnel or some other set of data packets are processed in another node. To be able to perform a change of nodes on the fly there typically has to be a synchronization process for informing all nodes of the existence and parameters of all IPSec tunnels ending at a network element cluster. Also the basis of other methods for determining distribution decisions may change dynamically.

A further advantage of the invention is that it is compatible with the IKE and IPSec protocols. The other endpoint of an IKE negotiation or of an IPSec tunnel may thus be any IPSec compatible entity. It may be, for example, another network element cluster according to the invention, but it may as well be any other network element, such as a typical prior art IPSec gateway.

BRIEF DESCRIPTION OF THE DRAWINGS

Various embodiments of the invention will be described in detail below, by way of example only, with reference to the accompanying drawing, which

DETAILED DESCRIPTION OF THE INVENTION

Figure 1:
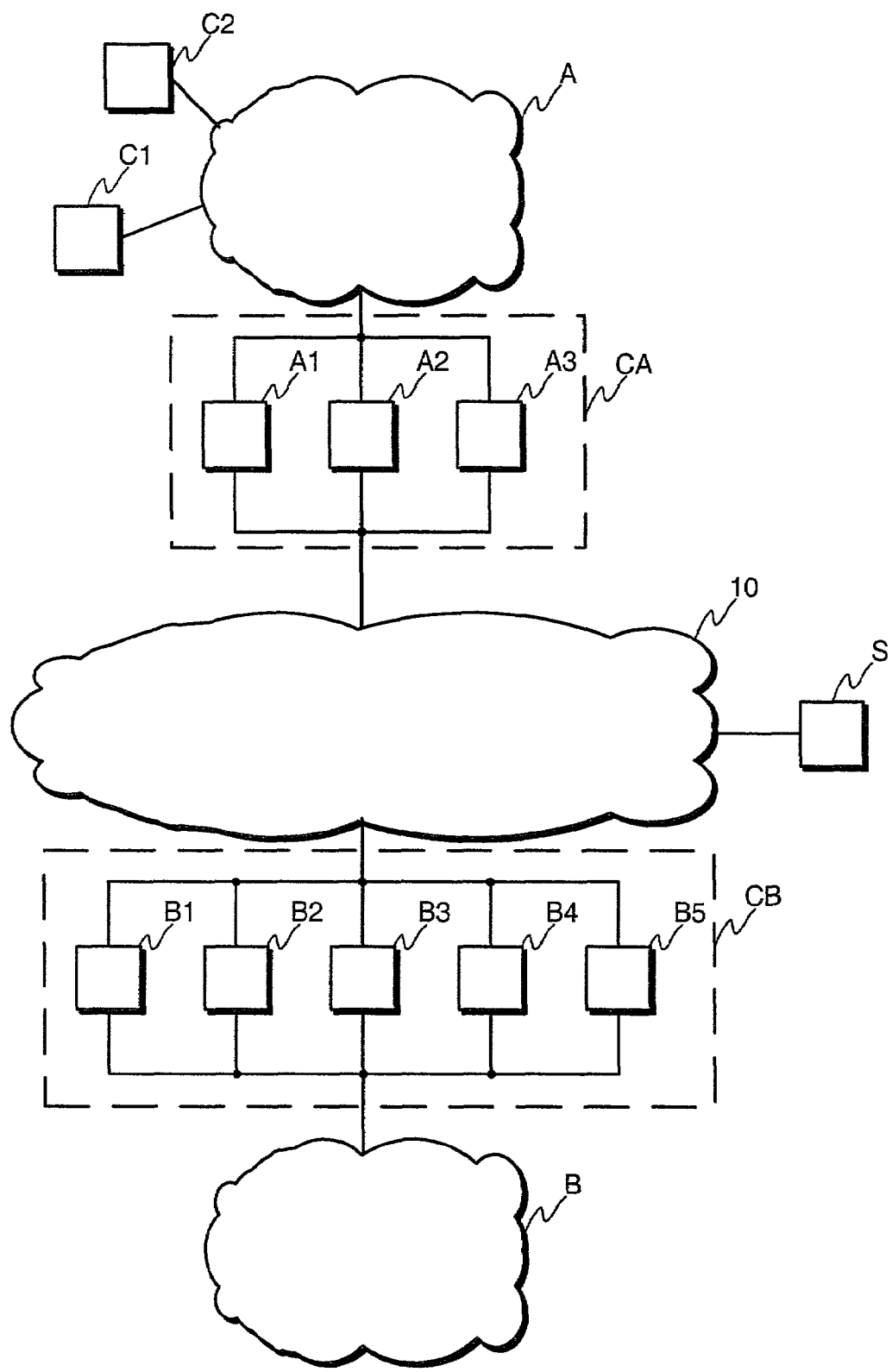
FIG. 1 illustrates a network structure using a clustered network element structure.

FIG. 1 is discussed in more detail above in connection with the prior art description.

Figure 2:
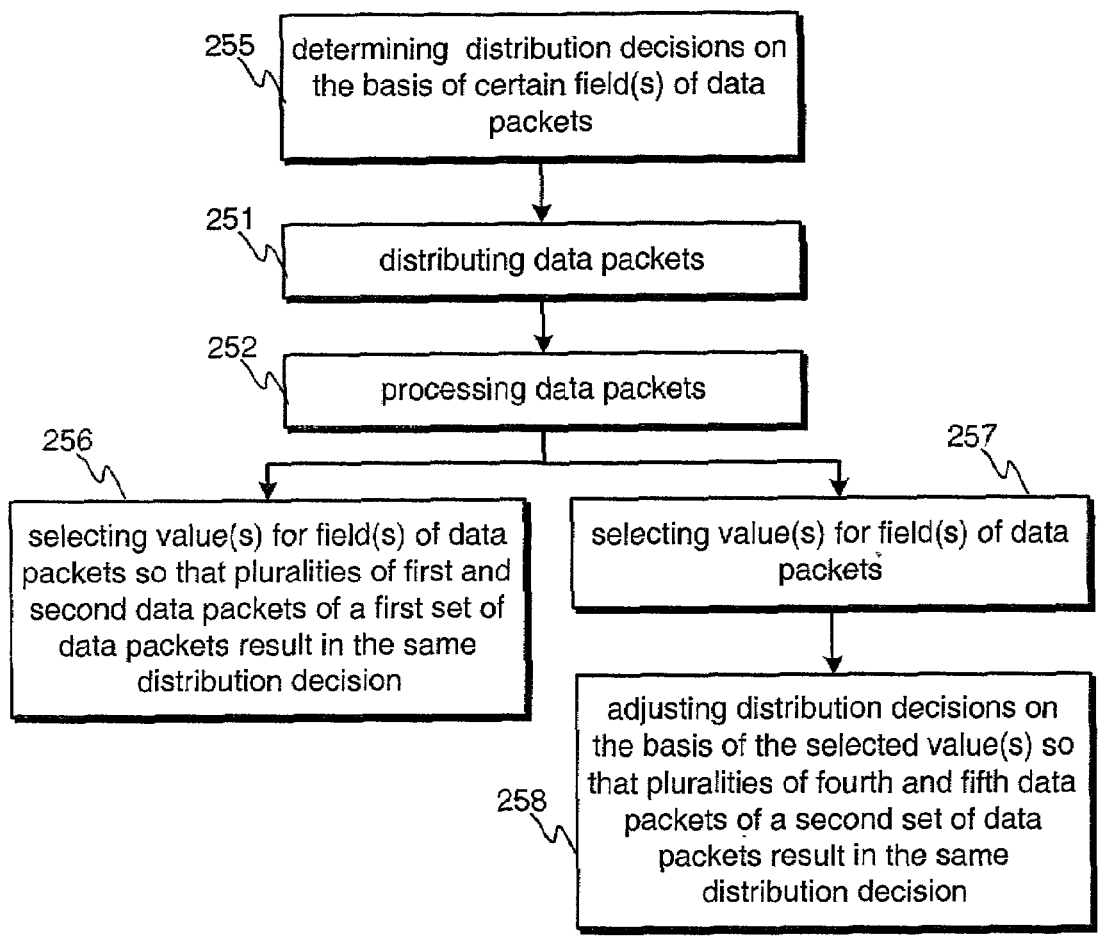
FIG. 2 illustrates a flowchart of methods according to the invention for processing data packets.

FIG. 2 illustrates as an example a flowchart of a method according to the invention for processing data packets within a network element cluster. First distribution decisions are determined according to predetermined criteria on the basis of certain field(s) of data packets (step 255). The data packets are then distributed to nodes of the network element cluster according to the distribution decisions (step 251). Typically allocation of distribution decisions to corresponding nodes is defined beforehand and may be changed dynamically. Data packets are processed in the node they are distributed to, and the processing involves selecting value(s) for at least partly arbitrary value(s) for at least one of said certain field(s) of at least one data packet (step 252).

The main aspect of the invention is presented in step 256 in which value(s) for at least one of said certain field(s) of data packets are selected so that pluralities of first and second data packets relating to a first set of data packets result in the same distribution decision. More specifically, such value(s) are selected for at least one of said certain field(s) of a third data packet, that distribution decisions determined according to the predetermined criteria for a plurality of first data packets and a plurality of second data packets are the same, said pluralities of first and second data packets belonging to a first set of data packets and said third data packet being related to said first set of data packets. This way, the fields of data packets used for determining distribution decisions may be predefined, however the fields may be data-packet-type specific. Also the way to use these fields may be data-packet-type specific. In general, selecting the value(s) is done on the basis of information about the grounds of determining distribution decisions.

Additionally or alternatively, value(s) for at least one of said certain field(s) of data packets may be selected at least partly arbitrarily, thereby obtaining selected value(s) (step 257). Distribution decisions are then adjusted on the basis of the selected value(s), so that pluralities of fourth and fifth data packets result in the same distribution decision (step 258). More specifically, said predetermined criteria may be adjusted on the basis of the value(s) selected for a sixth data packet so that said a plurality of fourth data packets and a plurality of fifth data packets result in the same distribution decision, said pluralities of fourth and fifth data packets belonging to a second set of data packets and said sixth data packet being related to said second set of data packets. In this case a data packet and respective node may be identified also on some other basis than the predefined criteria. Here determining distribution decisions is done on the basis of information about the selected value(s).

Typically the fields of data packets that are used for determining distribution decisions are header fields, but also other fields may be used. Hash functions are widely used for determining distribution decisions and distributing data packets. Advantageously, to each node in a network element cluster is allocated a separate set of hash values, hash values are calculated for data packets using certain fields, which may be data-packet-type specific, of data packets, and data packets are distributed to nodes of the network element cluster according to the calculated hash values. Hash functions are described in more detail later in this document, and the invention is described in conjunction with hash functions. Nevertheless, the invention is not limited to only the use of hash functions, but also other suitable functions may be used. Distribution decision may even be based on node identifiers, for example so that different values of some fields of data packets are linked to identifiers of different nodes. Various combinations of the values of field(s) of data packets and corresponding nodes may be for example maintained in a list, and field(s) of an arriving data packet are compared against the entries in the list in order to find the node the packet is distributed to. The list may be maintained in the nodes, and each node decides on the basis of the list whether to process or drop an arriving data packet. Alternatively, the list may be maintained partly or completely outside the nodes. Said predetermined criteria is typically information about what information is used for determining distribution decisions and about how this information is used. Information about hash function(s) to be used and/or the field(s) of data packets to be used may be included.

In the following, several embodiments for implementing the invention are described. The embodiments are described as examples only and any corresponding solution for implementing the invention may be used. Accordingly features of any embodiment may be combined with features of some other embodiment. A first embodiment concerns determining the distribution decisions by means of hash functions. A second and a third embodiment give implementations of the invention for use in relation with secure communications and NAT, respectively. A fourth embodiment gives a still further implementation of the invention, and finally, a fifth embodiment is related to server clusters. It is clear from the wide range of different embodiments of the invention that the invention can be applied in various ways, and that only some possibilities are described herein.

A hash function h is a function mapping a certain domain to a certain range, where the size of the range is typically much less than the size of the domain. A typical feature of a hash function is that it distributes input values, which are close to each other in the domain, evenly to the range. Therefore small changes in the input values may result in large changes in the corresponding hash values. In this description the domain and range typically consist of integer numbers, and the size of the domain is typically $2^M$ and the size of the range is typically $2^N$. The range size is typically selected so that $2^N$ is considerably larger than the number of nodes in a network element cluster. This way the hash function provides load sharing between the nodes of the network element cluster. For example, 256 hash values (i.e. N=8) may be suitable for a few nodes in a network element cluster.

According to the first embodiment of the invention, a set of hash values $H_i$ is allocated to each node of a network element cluster i. The sets $H_i$ are separate, in other words they do not have common hash values, and their union form the range of hash values. The number of hash values allocated to a node may vary from node to node, and if a certain node is for example out of service, the number of hash values allocated to that node is zero. Typically, as discussed above, the number of all hash values belonging to sets $H_i$ is much larger than the number of nodes in a network element cluster.

A hash function h applicable in processing a data packet in accordance with embodiments of the invention is, for example, a hash function mapping a domain of $2^{64}$ values or a domain of $2^{32}$ values into a range of $2^8$ values. The hash function h may be based on a predefined bitmask where, for example, the total number of bits is N and the number of value 1's in the bitmask is M. The hash function forms a hash value by extracting from an input value (typically a value of a header field) the bits in the positions marked with value 1's in the bitmask and interpreting the resulting series of bits as a hash value. If, for example, a header field having 64 bits is used in calculating a hash value and there are 256 possible hash values, the bitmask may have 64 bits and 8 of these are 1's. The bits, whose value is 1, in the bitmask may either be non-consecutive or consecutive, the latter offering better performance in most standard processor based solutions. The latter case actually means that only part of a header field is used as input for a hash function. It is conceptually equivalent, if only part of a header field is used as input for a hash function having a smaller domain or if some of the bits in a bitmask relating to a hash function having a larger domain are given value 0.

Typically outbound data packets, which are to be protected or to be transmitted as plaintext packets, have a standard IP header, when a network element cluster receives them from an internal network. A hash function $h_1$ is typically used to calculate a hash value H for an outbound data packet. The hash value is typically calculated using source and destination fields of an IP header. In addition to the source and destination fields, it is possible to use for example ports in calculating the hash values. Furthermore, it is possible to use also other field of data packets than header fields, and it is not obligatory to use the source and destination fields for calculating the hash values.

It is possible that for different data packet types different hash functions $h_j$ are defined. Typically the range of each data-packet-type specific hash function $h_j$ is the same, the domains may be different and, if the data functions are based on bitmasks, the bitmasks may be different. For example, for data packet relating to IPSec tunnel, a hash function $h_2$ may be used. For IKE Phase II data packets a hash function $h_3$ may be used, and for IKE Phase I data packet a hash function $h_4$ may be used. The header fields, which may be used as inputs for the hash functions, are discussed in more detail below.

Figure 3:
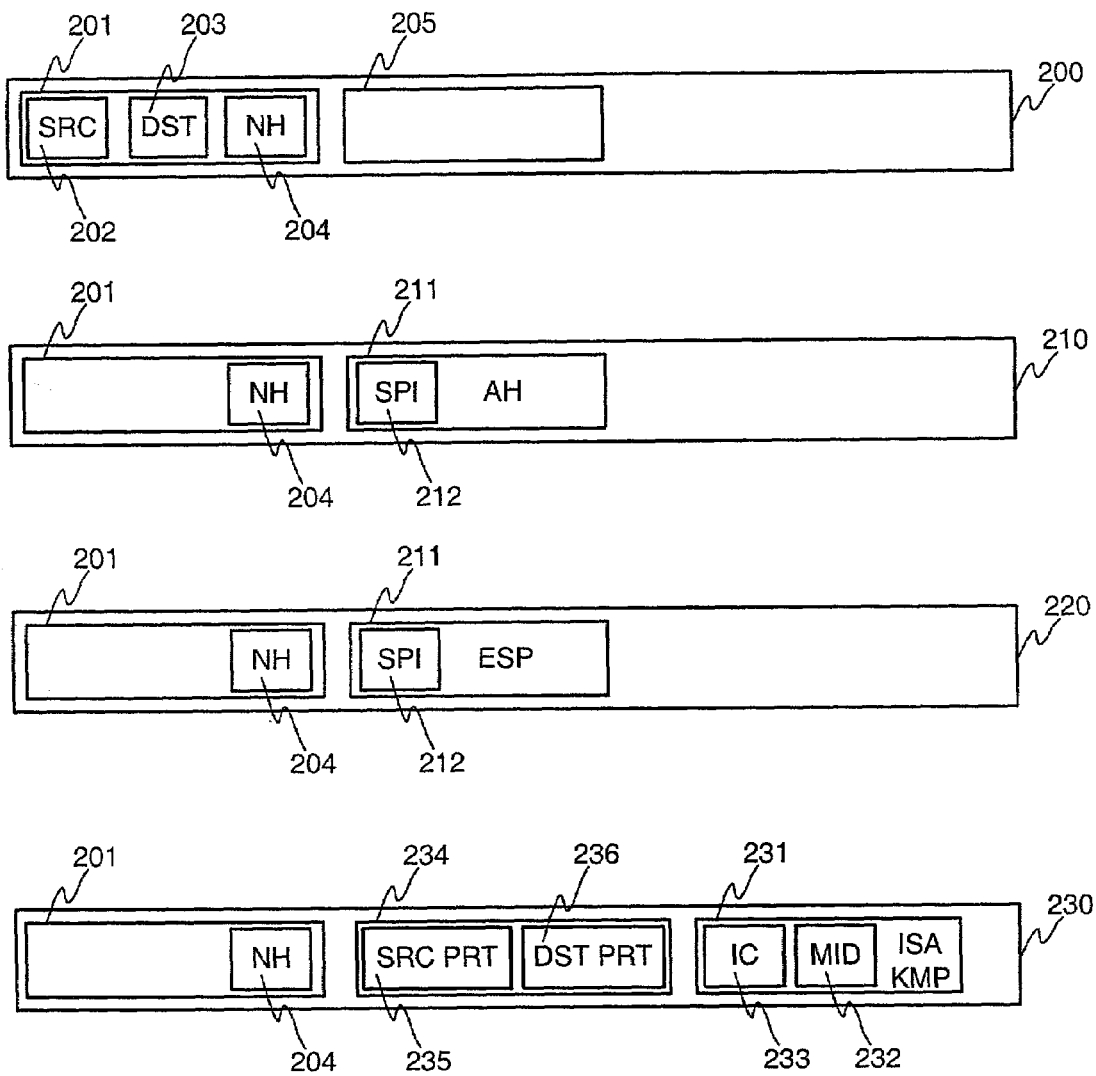
FIG. 3 illustrates schematically examples of data packets and header fields, which are suitable for use in accordance with the invention.

FIG. 3 presents schematically a data packet 200. It carries an IP header 201, which comprises source field 202 and destination field 203. The outer IP header further carries a field 204 indicating the type of the next header 205. In IPv4 protocol this field is a protocol field and in IPv6 protocol this field is a next header field. If the data packet is a non-secured (plaintext) data packet, the destination and source fields typically indicate the actual source and destination endpoints. For plaintext data packets, source and destination fields 202 and 203 are typically used in calculating hash values.

If a packet, typically an inbound data packet, is related to an IPSec tunnel, as data packet 210 or 220, the value of field 204 indicates that. For example, if the protocol field (IPv4) or the next header field (IPv6) is 51, the next header is an Authentication Header 211. Similarly, value 50 indicates an ESP header 221. Values 50 and 51, for example, thus indicate that a data packet 210, 220 is related to an IPSec tunnel. The values of the source and destination fields 202, 203 indicate in this case the two IPSec capable endpoints (for example two VPN gateways) between which the IPSec tunnel is established. In the AH header and in the ESP header there is, for example, an SPI (Security Parameter Index) field 212 whose value remains constant for all data packets relating to a certain IPSec tunnel. This SPI field indicates to which security association the data packet is related. Each Security Association terminating to an IPSec capable entity has a specific SPI value, which is unique in said IPSec capable entity.

In the following the second embodiment of the invention relating to secure communications and especially IPSec tunnels is described in more detail. A receiving entity selects a value for SPI during IKE Phase II negotiations. In a method according to the invention, typically more than one IPSec tunnels are established between a network element cluster and another VPN network element. Each of these IPSec tunnels has a unique SPI value (or values, if many unidirectional Security Associations pointing towards the network element cluster are relating to the same IPSec tunnel). When the receiving entity (i.e. the network element cluster) selects a value for the SPI, it already knows the details of the Security Association. The details indicate values for header fields in outbound data packets. It may, therefore, select an SPI value so that a hash value, calculated using certain known fields of the outbound data packets, is equal to a hash value calculated using said SPI value. This way inbound data packets and outbound data packets relating to a certain IPSec tunnel are processed in the same node of a network element cluster. Typically the hash functions used in calculating a hash value for an outbound data packet and a hash value for an inbound data packet are different. The SPI field has 32 bits, and a hash function mapping a domain of $2^{32}$ to a smaller range, for example, to a range of $2^8$, is used here. Alternatively, it is possible to use only part of the SPI field in calculating the hash value.

It is possible, for example, to establish IPSec tunnels so that each endpoint pair (endpoint source address, endpoint destination address) has a specific IPSec tunnel. In this case, the source address and destination address of an outbound data packet are used in calculating a hash value for an outbound data packet. Alternatively, it is possible to establish IPSec tunnels so that the IPSec tunnels are specific for port and/or protocol in addition to endpoint pairs, i.e. there may be many IPSec tunnels corresponding to an endpoint pair. In this case, information about port and/or protocol is used in addition to source and destination addresses in calculating hash values. A further alternative is to establish IPSec tunnels between subnetworks. In this case the hash function $h_1$ is typically configured to produce or selected so that it produces a same hash value for a subnetwork pair irrespective of the specific endpoint addresses within said subnetworks.

Data packet 230 in FIG. 3 relates to IKE protocol. Data packet 230 has a first inner header 234, which is a UDP header. The protocol field (IPv4) or the next header field (IPv6) 204 indicates the presence of this UDP header. The source port field 235 and destination port field 236 values for a UDP packet carrying IKE protocol information are typically 500. Data packet 230 has a second inner header 231, which is an ISAKMP (Internet Security Association and Key Management Protocol) header, which is described in detail in RFCs 2407 and 2408. The presence of the ISAKMP header is indicated, for example, by value 500 of the source and destination port fields in the UDP header 235. Data packet 230 may be a data packet relating to IKE Phase II negotiation, and in this case a Message Identifier field 232 in the ISAKMP header 201 is non-zero. The value of the Message Identifier field is the same for all messages relating to a certain IKE Phase II negotiation, so it is an example of a header field which may be used in calculating hash values: all packets relating to a certain IKE Phase II negotiation are processed in the same node of a network element cluster, when the Message Identifier is used in calculating hash values. Furthermore, if a node in a network element cluster initiates IKE Phase II negotiations, it may select such a value for the Message Identifier field that inbound data packets carrying information of the initiated IKE Phase II negotiation are processed by it. A node may initiate IKE Phase II negotiations, for example, when it processes an outbound data packet which it needs to secure, but for which an IPSec tunnel is not yet established. If a network element cluster is not the initiating party of an IKE Phase II negotiation, the node which is indicated by the hash value calculated using, for example the Message Identifier field, processes the IKE Phase II negotiation. The Message Identifier field is 32 bits long. It is possible to use all the bits of Message Identifier field or only some of the bits in calculating the hash value, i.e. the domain of the hash function may be $2^{32}$ or smaller.

Data packet 230 may alternatively relate to IKE Phase I negotiations, using which two VPN network elements, for example, establish an IKE Security Association (SA). In a data packet relating to IKE Phase I negotiations, the Message Identifier field 232 value is zero. An Identifier Cookie field 233, on the other hand, has a value, which stays the same for all messages relating to an IKE Phase I negotiation. This Identifier Cookie can therefore be used in calculating hash values for inbound data packets relating to IKE Phase I negotiations. If a node in a network element cluster initiates an IKE Phase I negotiation, it may select a value for the Initiator Cookie so that inbound data packets relating to that specific IKE Phase I negotiation are processed by it. If a network element cluster is not the initiating party of an IKE Phase I negotiations, the node indicated by a hash value calculated using, for example, the Initiator Cookie field, is processing inbound data packets relating to said IKE Phase I negotiations. The Initiator Cookie field is 64 bits long. It is possible to use all the bits of the Initiator Cookie field or only some of the bits in calculating the hash value, i.e. the domain of the hash function may be $2^{64}$ or smaller.

A further example of a protocol field that may be used in a method or arrangement according to the invention is ID field relating to Internet Control Message Protocol (ICMP). ICMP packets are carried within IP packets, similarly as TCP, UDP, ESP or AH packets. The invention may thus be used for processing ICMP packets in a cluster of nodes.

Figure 4A:
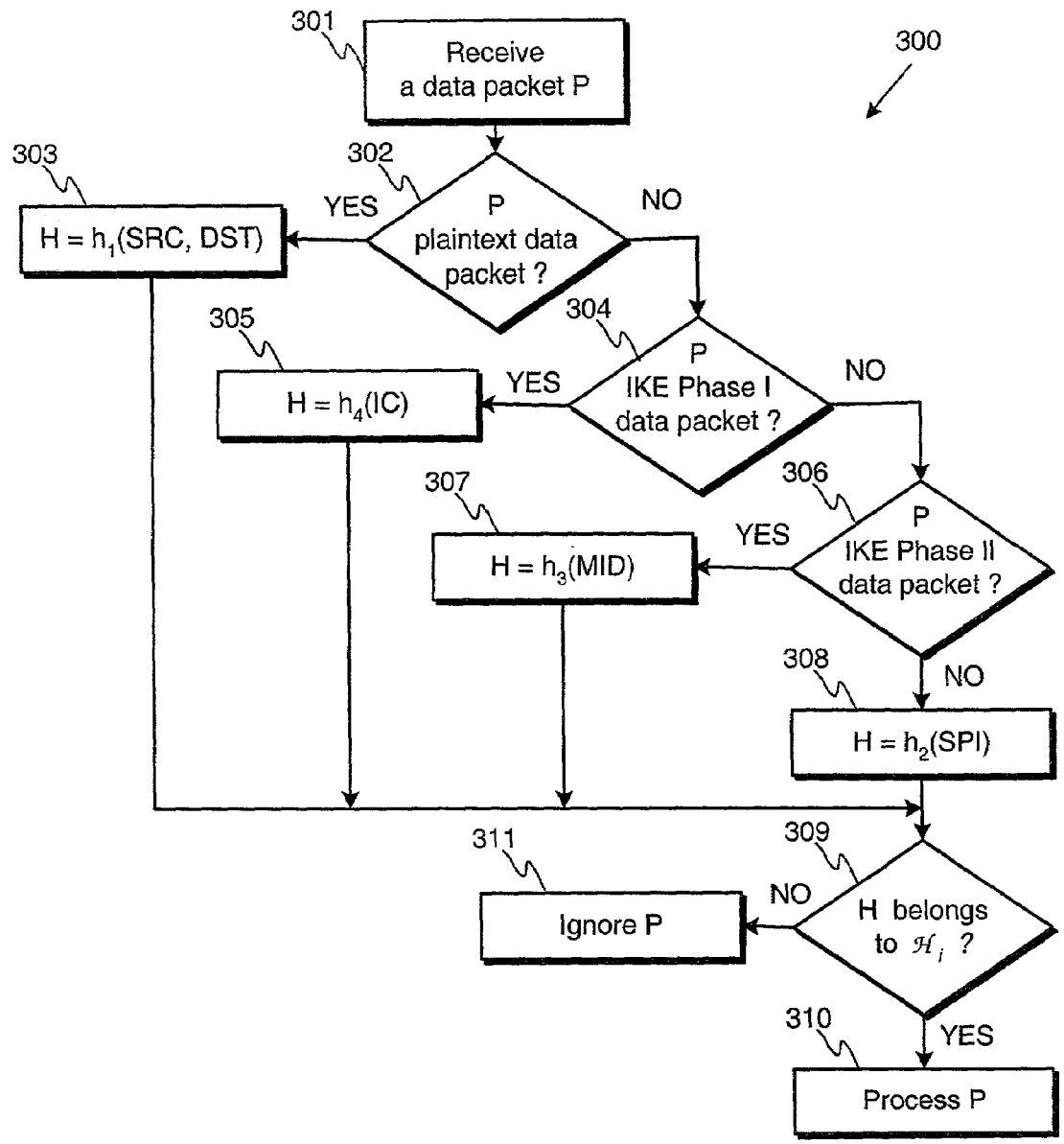
FIG. 4A illustrates a flowchart of a method according to the invention for filtering data packets in a node of a network element cluster.

FIG. 4A illustrates as an example a flowchart of a method 300 for filtering a data packet. This method may be implemented in nodes of a network element cluster or some of the functionality may be implemented outside the nodes. In step 301 a data packet is received. If it is a plaintext data packet (step 302), a hash function $h_1$(source address, destination address), for example, may be used to determine a hash value H for said data packet (step 303). If the data packet is a data packet relating to IKE Phase I negotiations, a hash function $h_4$(Initiator Cookie) may be used to determine a hash value H for said data packet (steps 304, 305). If the data packet is a data packet relating to IKE Phase II negotiations, a hash function $h_3$(Message Identifier) may be used to determine a hash value H for said data packet (steps 306, 307). If the data packet is a data packet relating to IPSec tunnel, a hash function $h_2$(SPI) may be used to determine a hash value H for said data packet (step 308). In step 309 the hash value H of the data packet is compared to the set of hash values $H_i$ specific for the node i. If the hash value H of the data packet belongs to the set of hash values allocated for this node, the data packet is processed in this node (step 310). Otherwise the data packet is dropped by this node in step 311. The node, to which a hash value equal to the hash value of the data packet is allocated, thus processes the data packet.

A second example of the order in which the headers of a data packet are checked in accordance with the second embodiment of the invention is the following. First it is checked if a data packet has an ESP header, and in this case the hash value is calculated as in step 308. Otherwise it is checked, if the data packet has an AH header, and also in this case the hash value is calculated as in step 308. Thereafter it is checked if the data packet has an ISAKMP header. If it is a data packet relating to Phase I, the hash value is calculated as in step 305, otherwise the hash value is calculated as in step 307. If the packet has none of the specified headers, the hash value is calculated as in step 303.

Figure 4B:
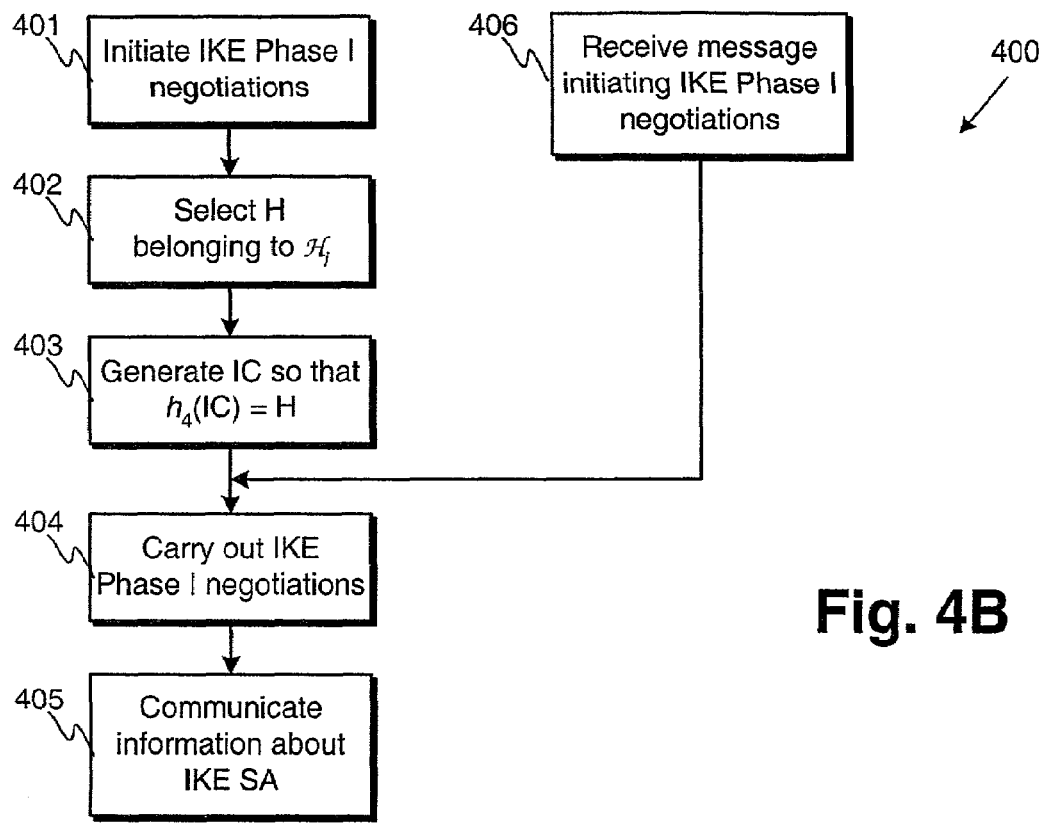
FIG. 4B illustrates a flowchart of a method for carrying out IKE Phase I negotiations in a node of a network element cluster according to the invention.

FIG. 4B illustrates as an example a flowchart of a method 400 for carrying out IKE Phase I negotiations in accordance with the second embodiment of the invention in a node of a network element cluster. In step 401 the IKE Phase I negotiations are initiated by the node. In step 402 the node selects one hash value H from the set of hash values $H_i$ that is allocated to it. In step 403 it determines an Initiator Cookie value for which $h_4$(Initiator Cookie) is equal to the selected hash value H. In step 404 the selected Initiator cookie value is used in IKE Phase I negotiations. In step 405, after the IKE Phase I negotiations, the node communicates information about the established IKE SA to other cluster nodes. They may need this information in carrying out IKE Phase II negotiations. Alternatively, IKE Phase I negotiations may be initiated by another party. In this case a node receives in step 406 an IKE Phase I message initiating the negotiations, said IKE Phase I message having a hash value belonging to set $H_i$. Thereafter the negotiation is carried out (step 404) and information about the established IKE SA is communicated to other cluster nodes in step 405.

The selection of the Initiator Cookie is done advantageously so that a cookie generator function, which is a part of a typical IPSec implementation, is modified to hide the value h to selected bits of the Initiator Cookie. A part of the Initiator Cookie is a sort of time stamp, and advantageously the hash value is hidden within this time stamp. If the hash value is hidden within the time stamp, there typically is no need to modify the cookie check function, which is also part of a typical IPSec implementation. The time stamp may have, for example, 24 bits.

An Initiator Cookie value producing a desired hash value H ∈$H_i$ can be selected, for example, in the following way. First the bitmask relating to a hash function $h_4$(Initiator Cookie) is defined; this bitmask advantageously indicates some bits relating to the time stamp. Thereafter a time stamp is generated. A desired hash value is selected and the bits of the time stamp, which are indicated by said bitmask, are modified so that the desired hash value is hidden within the time stamp. Thereafter a pseudo random number, which together with the time stamp forms the Initiator Cookie, is generated. In this generation of the pseudo random number, the source and destination IP addresses, the time stamp and a random number are used. The random number, which is kept secret, ensures that no other party can produce an identical Initiator Cookie using only the publicly available knowledge of the IP addresses and of the timestamp. Finally it is checked that such an Initiator Cookie value does not currently exist in the network element node. The probability of such a check to fail is very small, but if the check fails, the process is repeated until the check succeeds.

Figure 5:
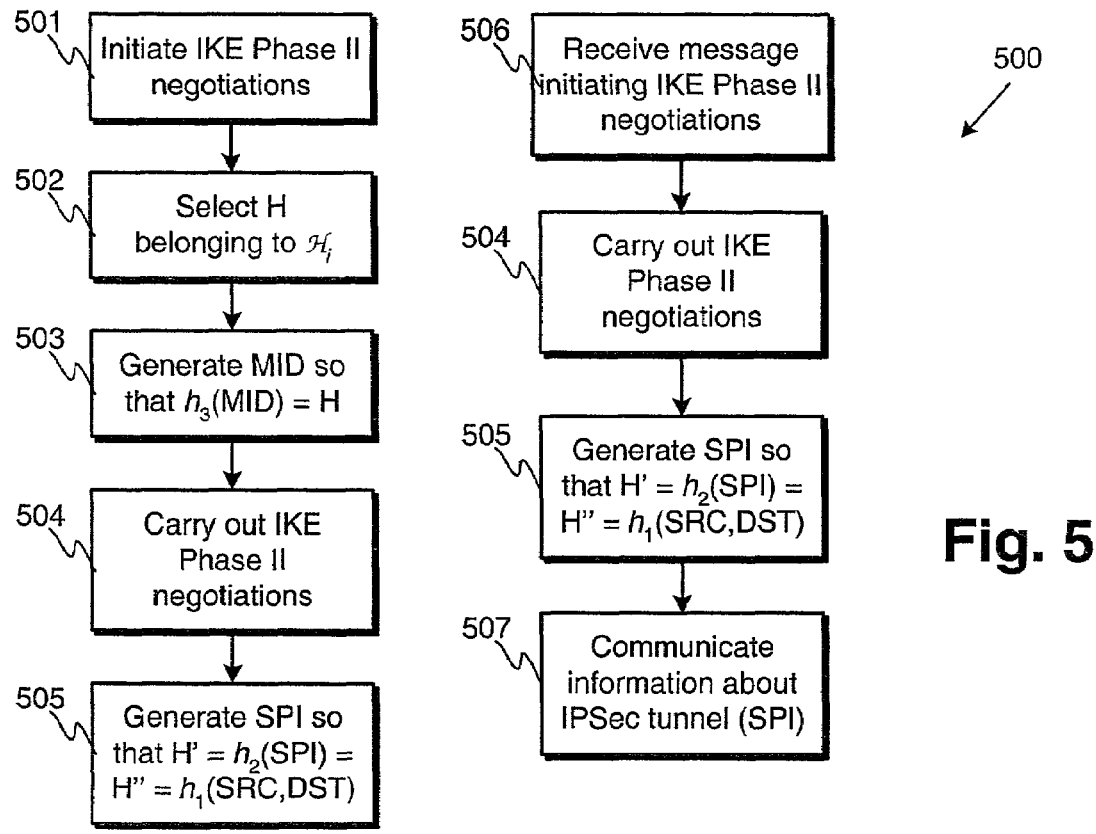
FIG. 5 illustrates a flowchart of a method for carrying out IKE Phase II negotiations in a node of a network element cluster according to the invention.

FIG. 5 illustrates as an example a flowchart of a method 500 for carrying out IKE Phase II negotiation in accordance with the second embodiment of the invention in a node of a network element cluster. In step 501 the IKE Phase II negotiations are initiated by the node. In this case, the node carrying out the IKE Phase II negotiation is typically the node processing also data packet relating to the IPSec tunnel, which is to be established with this IKE Phase II negotiation. In step 502 the node selects one hash H value from the set of hash values $H_i$ that is allocated to it. In step 503 it determines a Message Identifier value for which $h_3$(Message Identifier) is equal to the selected hash value H. In step 504 the selected Message Identifier value is used in IKE Phase II negotiations. In step 505, which occurs typically during the IKE Phase II negotiations, a value for the SPI field is selected. This SPI value is typically selected so that a hash value H' calculated using it, H'=$h_2$(SPI) is equal to H"=$h_1$(source address, destination address). H" is one of the hash values allocated for this node, H" ∈$H_i$ as this node has initiated IKE Phase II negotiations. Furthermore, the source address and destination address relating to the established IPSec tunnel are known at this point of the IKE Phase II negotiations.

The value for the Message Identifier and for the SPI can be selected similarly as explained above for the Initiator Cookie. It may be additionally advantageous to hide a selected SPI value, as by monitoring the SPI values selected in accordance with the invention, it may be possible to draw conclusions about the traffic secured using the secure tunnels. The selected SPI value may be hidden, for example, in the following way. After an SPI value resulting in a desired hash value is found, a new value SPI' is calculated using this SPI value and a random number. The random number may be a cluster-specific secret number. A cluster-specific secret number may be, for example, XORed with the selected SPI. When a data packet having an SPI' value is received, it is possible to determine straightforwardly the selected SPI value using the cluster-specific secret number and an inverse function of the function used to hide the SPI. For bitwise XOR, for example, the inverse function is bitwise XOR. In other words, instead of using a hash function $h_2$(SPI) a hash function $h'_2$(SPI, secret number) is used. In filtering the data packets, the same hash function $h'_2$(SPI, secret number) is also used.

Preferably there are many cluster-specific secret numbers in use, and for example certain bits of the new SPI' indicate, which secret number was used in calculating said SPI'. For example, the SPI' value may be two bits longer than the selected SPI value, and these two bits indicate the correct secret number. It is possible, for example, to have a few cluster-specific secret numbers at a time and the values of these numbers are updated every now and then. A new value for a secret number may be chosen, for example, when all secure tunnels using the old value are removed. New tunnels to be established may use, for example, the most recently updated secret number.

If another party initiates the IKE Phase II negotiations, a message indicating this is received in step 506. In this case the node processing the IKE phase II negotiations may be some other node than the node processing the inbound and outbound data packets relating to the IPSec tunnel being established. In step 504, IKE phase II negotiation are carried out. In step 505, which occurs typically during the IKE Phase II negotiations, a value for the SPI field is selected. In this case, this value is selected so that a hash value $H'=h_2$(SPI) is equal to a hash value $H''=h_1$(source address, destination address). The source address and destination address of outbound data packets relating to the IPSec tunnel, to which the current IKE Phase II negotiation is relating, are known at this point of the IKE Phase II negotiations. After the IKE Phase II negotiations, information about the established IPSec tunnel (i.e. information about the established Security Associations) is communicated to the node, to which the hash value $H_1$ is allocated (step 507). This node then processes the inbound and outbound data packets relating to the established IPSec tunnel.

It is possible that two Security Associations are relating to a certain IPSec tunnel in one direction; for example, one may be a Security Association, which specifies the use of ESP, and the other may specify the use of AH. In this case both the SPI values are typically selected so that they result in the desired hash value. Typically only the outer header (and the outer SPI field) is used in processing a data packet. The outer field is typically the AH field.

Figure 6A:
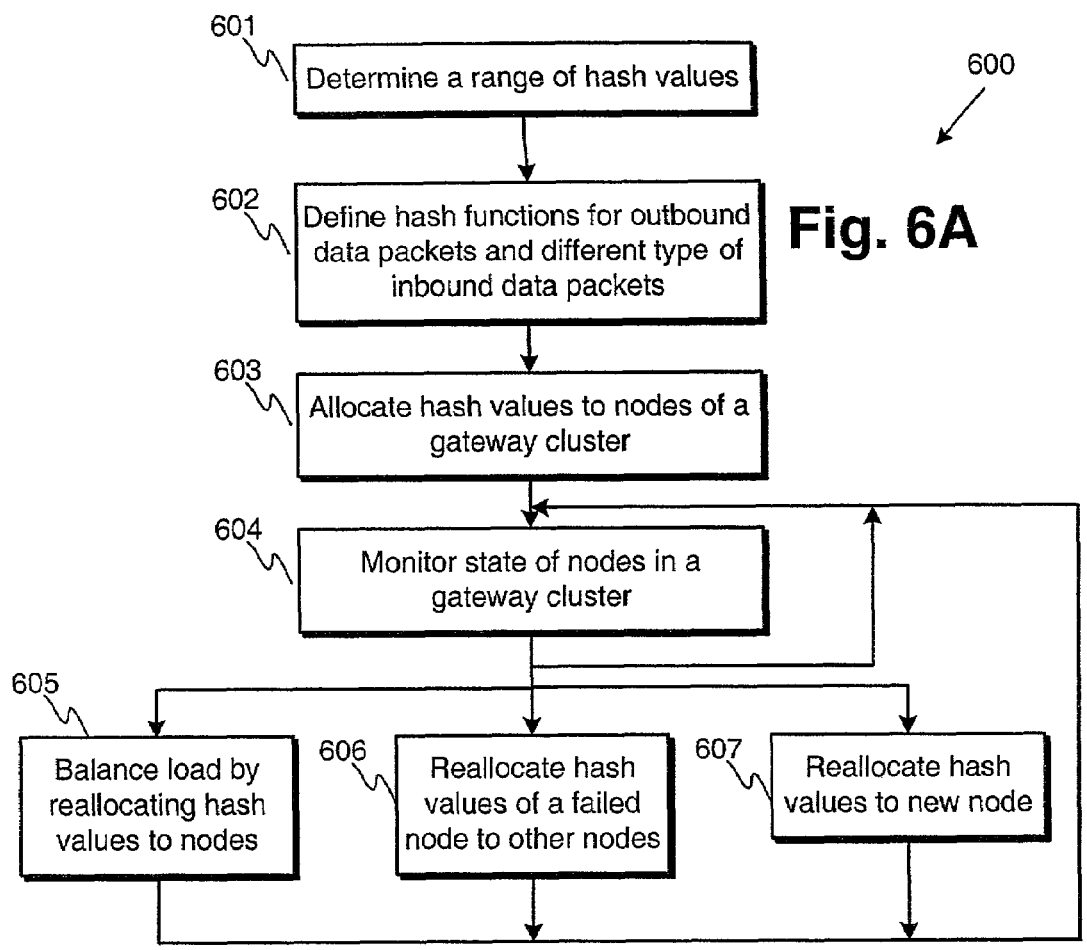
FIG. 6A illustrates a flowchart of a method for reallocating hash values to nodes in a network element cluster according to the invention.

FIG. 6A illustrates as an example a flowchart of a method 600 for controlling nodes in a network element cluster. In step 601 a suitable range of hash values is determined; the total number of hash values typically depends on the number of nodes in a network element cluster. In step 602, suitable hash functions and relating header fields in data packets are selected. For data packets relating to IKE protocol, these header fields may be, for example, the Initiator Cookie and Message Identifier fields of an ISAKMP header and for data packets relating to established IPSec tunnels these may be, for example, SPI field of an AH or ESP header, as discussed above. For data packets, which are different from data packet in accordance to IPSec protocol suite, the header fields may be, for example, the source and destination fields of an IP header. It is possible additionally or alternatively use the Port field of a TCP or UDP header. Ranges of the hash functions typically are the determined range of hash values. (Alternatively, a range may form a subset of the determined range, but the load balancing effect is typically deteriorated in this case.) It is possible that, for example, for two sorts of data packets similar hash functions are used, although the header fields, using which hash values are calculated, are typically different for the data packet sorts.

In step 603 the hash values of the determined range are allocated to nodes of the network element cluster. The number of hash values allocated for each node may be node-dependent, or it may be the same for all nodes. Typically steps 601-603 are carried out in designing or configuring a network element cluster.

In step 604, which is carried out when the network element cluster is in function, the state of at least some of the nodes of the network element cluster is monitored. Typically the number of secure tunnels in a node or the current load in a node is monitored. The monitoring may be carried out, for example, periodically. If there is need to balance load between nodes, in step 605 the hash values are reallocated to nodes accordingly. Typically, part of hash values previously allocated to a node, which has more load than other nodes, may be reallocated to other nodes. If a node is down, i.e. it is not operational, the hash values allocated to that node may be reallocated to other nodes in step 606. Furthermore, if a node is up again or if new nodes are dynamically added to the network element cluster, part of the hash values of the hash value range is reallocated to a new node in step 607.

Figure 6B:
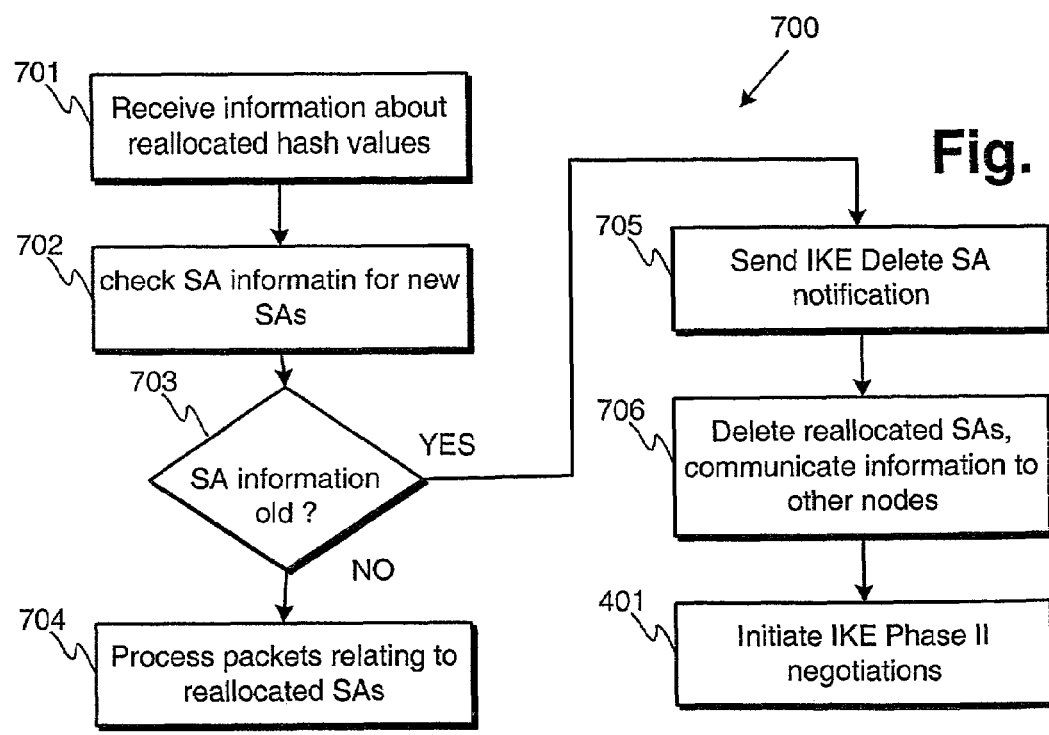
FIG. 6B illustrates a flowchart of a method for recovering IPSec connections in a node of a network element cluster according to the invention.

FIG. 6B illustrates as an example a flowchart of a method 700 for recovering lost IPSec connections in a node of a network element cluster according to the invention. In step 701 a reallocation of hash values occurs. A node typically receives information about its current hash values at this point. In step 702, a node checks if there currently are IPSec tunnels (or, in other words, SAs) relating to new hash values, which were reallocated to this node. These IPSec tunnels are here called lost IPSec tunnels, as they are not any more handled by the node (old node) that before the reallocation was responsible for them. To enable the checking of lost IPSec tunnels, information about all IPSec tunnels (or SAs) relating to a network element cluster is typically either communicated to all nodes in the network element cluster or is otherwise available to nodes in the network element cluster. This information about IPSec tunnels (or SAs) typically comprises information about sequence numbers of transmitted data packets relating to an IPSec tunnel. Typically the information about IPSec tunnels is updated periodically, not after each transmitted or received data packet. The sequence number of data packets, which a network element sends, should not decrease. Therefore, if information about a lost IPSec tunnel is updated quite recently, it is possible to increase this sequence number with a certain number and continue to process data packets relating to a temporarily lost IPSec tunnel in a new node (steps 703, 704). If the update of the information relating to IPSec tunnel is not recent, the new node may send to the other endpoint of the IPSec tunnel a message indicating that the IPSec tunnel has been deleted (steps 703, 705). IKE Delete Notification message is an example of such a message. Thereafter in step 706 the IPSec tunnel, or the Security Associations relating to said IPSec tunnel, are deleted. This information is again typically communicated to other nodes in the network element cluster. In step 401 IKE negotiations are initiated for establishing a new IPSec tunnel to replace the deleted IPSec tunnel.

The invention is applicable also for processing other data packets than data packets of secured connections discussed above. Data packets of simple connections, where inbound and outbound data packets have similar plaintext header fields, are simple to direct to the same node of a network element cluster. As was stated previously in this document in connection with FIG. 4A for example a hash function $h_1$(source address, destination address), may be used to determine a hash value H for inbound and outbound data packets having plaintext header fields. Nevertheless, the problem arising when the plaintext header fields of data packets are modified in the network element cluster, for example as a result of NAT, was discussed in connection with prior art. The third embodiment of the invention addresses this problem.

Figure 7A:
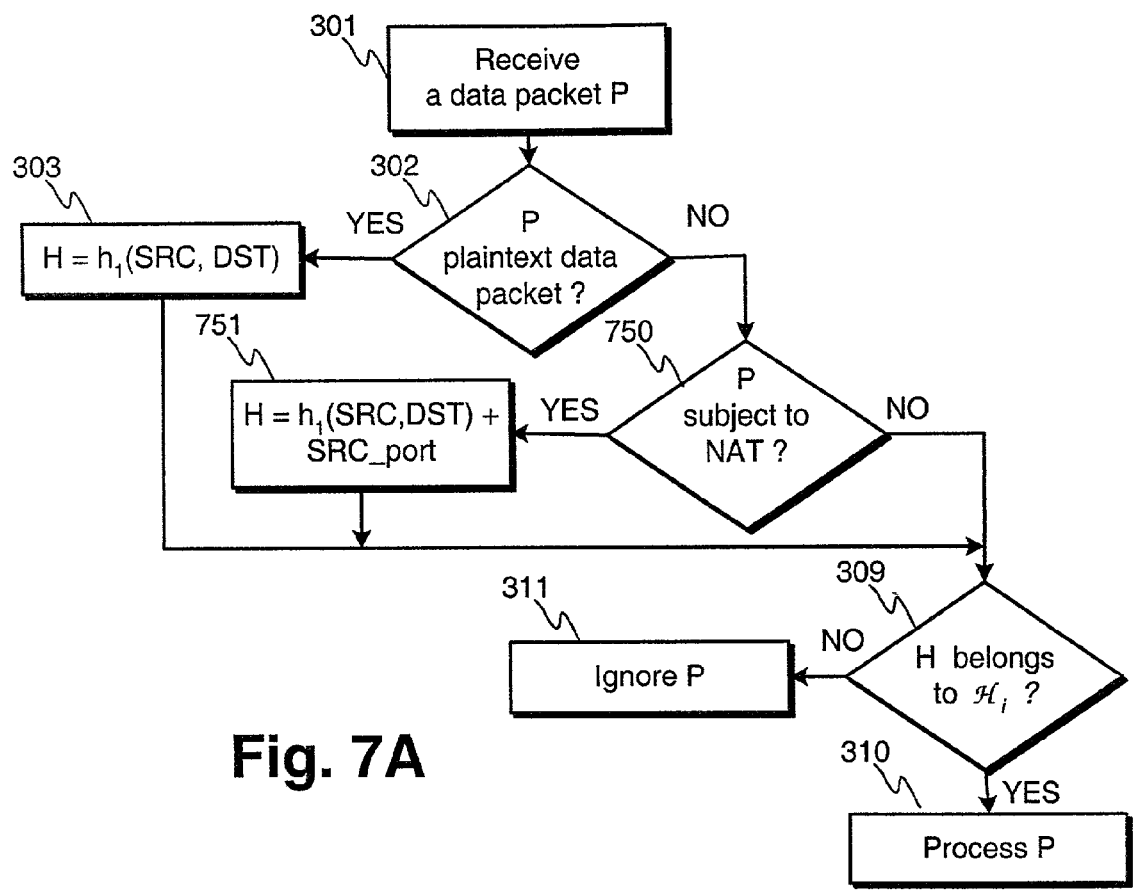
FIG. 7A illustrates a flowchart of a method for filtering a data packet subject to NAT.

FIG. 7A illustrates as an example a flowchart of a method for filtering a data packet subject to NAT. The method is especially suitable for NAT, which hides all addresses of an internal network behind one (or more) address(es). This method may be implemented in nodes of a network element cluster or some of the functionality may be implemented outside the nodes. In step 301 a data packet is received. If it is a plaintext data packet (step 302), a hash function $h_1$(source address, destination address), for example, may be used to determine a hash value H for said data packet (step 303). Until this point the method is similar to the method of FIG. 4A. If the data packet is subject to NAT, a function $H=(h_1$(source address, destination address)+source port) may be used to determine a hash value H for said data packet (steps 750, 751). In step 309 the hash value H of the data packet is compared to the set of hash values $H_i$ specific for the node i. If the hash value H of the data packet belongs to the set of hash values allocated for this node, the data packet is processed in this node (step 310). Otherwise the data packet is dropped by this node in step 311. The node, to which a hash value equal to the hash value of the data packet is allocated, thus processes the data packet.

The values for NAT are selected so that ($h_1$(NAT address, destination address)+NAT port)=($h_1$(source address, destination address)+source port). Thus inbound and outbound data packets result in the same hash value and are therefore directed to the same node of a cluster. This way, there is no need to know the details of the NAT for making the distribution decision. The method presented for calculating the hash values for inbound and outbound data packets is an example only, and it is stated that also some other implementations may be suitable for determining distribution decisions for data packets subject to NAT.

If data packets are subject to static NAT, i.e. a specific internal address is always replaced by the same specific NAT address, it is possible to adjust the distribution decisions accordingly. There is maintained for example a list of internal addresses subject to static NAT and corresponding NAT addresses. If a data packet in which the source address matches to one of the internal addresses of such list, a hash function $h_1$(NAT address, destination address), NAT address being an address corresponding to the source address in said list, may be used to determine a hash value H for said data packet.

Furthermore, according to the fourth embodiment of the invention, there may be maintained a list in which each entry includes some identifier(s) of a data packet and a corresponding node in which the data packet is to be processed. For example, it may not be always desired or even possible to select values of some fields of data packets according to predetermined rules. In this case, the values for a data packet may be selected first in a node and then the distribution decisions may be adjusted for example by means of said list. The selected value(s) and possibly some other identifier of the data packet are conveyed to said list together with an identifier of the respective node for mapping all other data packets of the same connection to the same node.

Furthermore, the invention is applicable also for clusters of other kinds of network elements than security gateways, where the second and the third embodiment of the invention are preferably employed. The fifth embodiment of the invention addresses the problem of directing a plurality of connections relating to the same communication session to the same server node of a server cluster. Clearly, the invention is not restricted to only server clusters and security gateway clusters, but may be applied in any suitable network element clusters.

SSL protocol providing communications privacy over public networks was briefly discussed in connection with prior art. During SSL handshake phase the client sends a ClientHello message to which the server must respond with a ServerHello message. In these hello messages a Session ID is established. Additionally two random values are exchanged between the client and the server. Following the hello messages, the server will send its certificate, if it is to be authenticated. Additionally, a ServerKeyExchange message may be sent, if it is required. If the server is authenticated, it may request a certificate from the client. Then the server sends a ServerHelloDone message, indicating that the hello-message phase of the handshake is complete, and waits for a client response. The client may send a Certificate, if it has been requested by the server. Then the client sends a ClientKeyExchange message and optionally a CertificateVerifyMessage. In the next phase, the client sends a ChangeCipherSpec message and a Finished message. The server responds with its own ChangeCipherSpec message and Finished message. Now the handshake is complete and the client and the server may start to transfer data.

When the client and the server decide to open a new connection relating to an already opened communication session, to resume a previous communication session or to duplicate an existing communication session, i.e. not to negotiate new security parameters, the procedure of initiating data transfer is following: The client sends a ClientHello message with the Session ID of the communication session to be resumed. The server checks its session cache, if the Session ID is found in there. If so and the server is willing to accept the communication session, it responds with a ServerHello with the same Session ID value. Then the client and the server send ChangeCipherSpec messages and Finished messages and data transfer may be started. If the Session ID is not found in the session cache, the client and the server perform a full handshake.

According to the fifth embodiment of the invention SSL Session ID is used for determining distribution decisions without need of inspecting the contents of outbound data packets.

In the data packet level a communication connection is first opened and only after that an SSL Hello (ClientHello or ServerHello) message is sent. In TCP (Transmission Control Protocol) a connection is opened with a SYN packet, and a SYNACK packet is sent as response to the SYN packet. Only after this establishment of a connection an SSL Hello message is sent. Lets assume that determining distribution decisions is done in a separate clustering layer with respect to the actual server. The clustering layer may be implemented as software running in the same computer with the server software, in which case the clustering layer is incorporated in all nodes of a cluster and the clustering layer filters the incoming data packets and decides which data packets are to be processed in that particular server node. Optionally it is possible that the clustering layer is implemented as a separate device, and each node receives only the data packets it is supposed to process. In principle, the operation of the clustering layer is similar irrespective of the actual implementation.

Now when a SYN packet from a client is received at the clustering layer, it advantageously responds to it with a SYNACK packet without involving the actual server. Then when a packet containing an SSL ClientHello message is received, it is checked if a Session ID is included in the Hello message. If a Session ID is not included, a node i to process the connection is selected for example randomly or as a result of some load balancing algorithm, and the connection is forwarded to the selected node i. The operation of the invention does not depend on different load balancing algorithms or means for selecting the node to process the first connection of a communication session, and therefore they are not discussed any further here. The same distribution decision then is applied to all subsequent data packets of the same connection, and so they are directed to the same node i. It is possible that for example the values of some fields of the data packets, which fields are constant in all data packets of that connection and thus enable identifying that connection, are maintained in a list together with an identifier of the respective node in the clustering layer. The node i processing the ClientHello packet then selects a Session ID for that communication session. The selection of the Session ID may be done on the basis of knowledge about the way to determine distribution decisions in the clustering layer. Advantageously, the distribution decisions are at least partly based on the Session ID values and the selection is made so that data packets containing that Session ID are distributed to the node i. Alternatively the Session ID may be selected in the node i irrespective of the clustering layer, in which case knowledge of the selection is conveyed to the clustering layer, so that the distribution decisions may be adjusted so that the connections relating to the selected Session ID are directed to the node i.

If a Session ID is included in an SSL ClientHello message, the selection (distribution decision) of the node to process the connection is made on the basis of the Session ID. For example a hash function $H=h_5(Session\ ID)$ may be used for finding out the correct node. Alternatively, a list of Session ID values belonging to each node may be maintained, in which case the correct node is found out as a result of comparing a Session ID of a ClientHello message to the values in the list. Such list is especially suitable, if the nodes select the Session ID values irrespective of the clustering layer. Also in this case, it is advantageous to maintain a list of the values of some fields of the data packets, which fields are constant in all data packets of that connection and thus enable identifying that connection, together with an identifier of the respective node in the clustering layer. This list is used for finding out the correct node to data packets, which are not SSL Hello messages and thus do not contain Session ID.

Figure 7B:
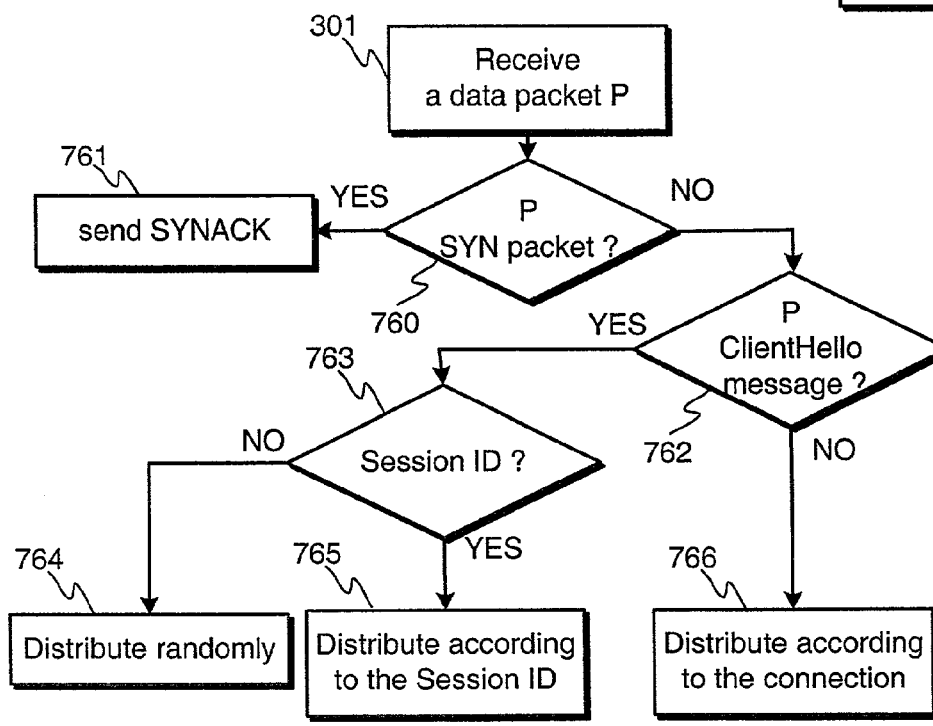
FIG. 7B illustrates a flowchart of a method for filtering a data packet of an SSL connection.

FIG. 7B illustrates as an example a flowchart of a method for filtering a data packet of an SSL connection in accordance with the fifth embodiment of the invention. In step 301 a data packet P is received. If it is a SYN packet (step 760), a SYNACK is sent to the client. If P is not a SYN packet it is checked if it is a ClientHello message and if it contains a Session ID (steps 762 and 763). If it is a ClientHello message but does not contain Session ID, the connection may be distributed randomly or on the basis of some load balancing algorithm (step 764). If a ClientHello message contains Session ID, the connection is distributed on the basis of the Session ID, i.e. to the node that is processing also other connections relating to that Session ID (step 765). If the packet is not a ClientHello, it is a packet of some already opened connection and it is distributed to the node which is processing all other packets of that connection (step 766).

If for example a hash function $h_5(Session\ ID)$ is used for finding out the correct node on the basis of the Session ID value, the Session ID is selected in a node i so that $h_5(Session\ ID)=H$ and H belongs to the set of hash values $H_i$ specific for the node i. Thus all data packets opening a new connection relating to the same communication session are directed to the same node of a cluster. After a node is selected for processing a data packet opening a new connection, knowledge of the connection and respective node is maintained in the clustering layer. On the basis of this knowledge subsequent data packets of opened connections (do not contain Session ID) are then directed to the same node as well. This way, all data packets of one communication session are directed to the same node and there is no need to inspect the messages of the handshake phase in order to find out the Session ID and to make the distribution decision.

It is pointed out that HTTP cookies may be used in a similar manner to the SSL Session IDs. Due to the fact that HTTP and SSL are well known protocols, it is clear to a person skilled in the art that using HTTP cookies this way is feasible and may be implemented on the basis of the above description. Therefore distributing connections of HTTP communication sessions on the basis of an HTTP cookie is not addressed any further here.

Figure 8A:
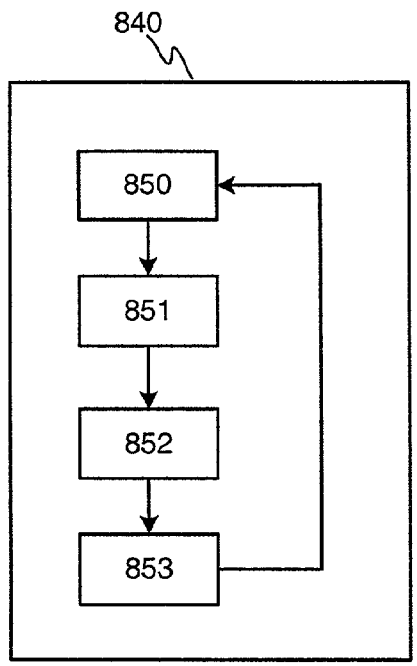
FIG. 8 illustrates schematically a node of a network element cluster according to the invention.

FIG. 8A illustrates schematically, as an example, a node 840 of a network element cluster according to the invention. Node 840 comprises means 850 for determining distribution decisions on the basis of certain field(s) of data packets according to predetermined criteria, means 851 for accepting data packets for processing according to the distribution decisions, and means 852 for processing data packets. Further node 840 comprises means 853 for selecting at least partly arbitrary value(s) for at least one of said certain field(s) of data packets. Typically means 853 are included in means 852 for processing. Further, means 853 for selecting are adapted to select such value(s) for at least one of said certain field(s) of a third data packet, that distribution decisions determined according to the predetermined criteria for a plurality of first data packets and a plurality of second data packets are the same, said pluralities of first and second data packets belonging to a first set of data packets and said third data packet being related to said first set of data packets.

Additionally or alternatively, means 853 for selecting may be adapted to provide at least partly arbitrarily selected value(s), and means 850 for determining distribution decisions may be adapted to adjust said predetermined criteria on the basis of said selected value(s) concerning a sixth data packet, so that said a plurality of fourth data packets and a plurality of fifth data packets result in the same distribution decision, said pluralities of fourth and fifth data packets belonging to a second set of data packets and said sixth data packet being related to said second set of data packets.

Means 850 for determining distribution decisions and means 851 for accepting data packets for processing may be implemented in a separate clustering layer. In that case, the clustering layer is typically implemented as software running in the same computer with the actual application to be clustered, and the clustering layer is incorporated in all nodes of a cluster and the clustering layer filters the incoming data packets and decides which data packets are to be processed in that particular node. Advantageously, the clustering layer may be implemented as a separate device, which distributes data packets to nodes according to the distribution decisions and each node receives only the data packets it is supposed to process. Such separate device may be for example a network switch. Nevertheless, the actual application to be clustered needs to have knowledge of the grounds of determining distribution decisions in order to select suitable values for some fields of data packets. In principle, the operation of the clustering layer is similar irrespective of the actual implementation as was stated earlier in this document.

Figure 8B:
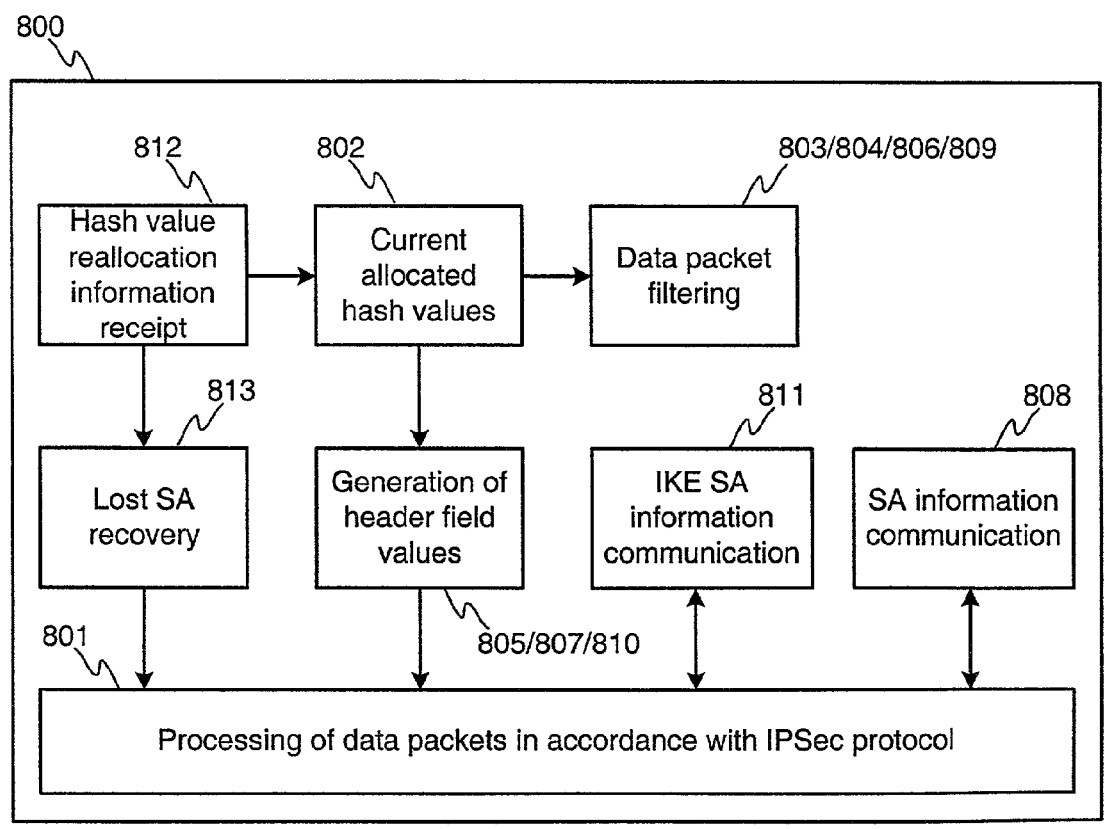

FIG. 8B illustrates schematically, as an example, a node 800 of a network element cluster according to the second embodiment of the invention. The node comprises means 801 for processing data packets and establishing secure tunnels in accordance with the IPSec protocol, means 802 for storing hash values, which are currently allocated to said node, and means 803 for filtering at least a plurality of first data packets based on packet-specific first hash values. The first packet-specific hash value are calculated using a first hash function and first header field(s) of a data packet, and said means 803 are arranged to accept only data packets having one of the hash values currently allocated to said node. Furthermore, a node 800 according to the invention comprises means 804 for filtering a plurality of second data packets, which are data packets of secure tunnel according to a protocol suite for securing packet data communications, based on second packet-specific hash values. A second packet-specific hash value is calculated using a second hash function and second header field(s) of a second data packet, and said means 804 are arranged to accept only second data packets having one of the hash values being currently allocated to said node. A node 800 further comprises means 805 for generating value(s) for the second header field(s), arranged to generate such value(s) that a hash value calculated using said value(s) and the second hash function is a hash value currently allocated to said node. The second data packets are typically data packets having either an AH or an ESP header, and an example of the second header field is the SPI field of those headers. A node 800 according to the invention typically further comprises means 806 for filtering a plurality of third data packets, which are data packets in accordance with a protocol for establishing secure tunnels, based on third packet-specific hash values. A third packet-specific hash value is calculated using a third hash function and at least third header field(s) of a third data packet, and said means 806 are arranged to accept only third data packets having one of the hash values currently allocated to said node. In addition a node 800 typically comprises means 807 for generating value(s) for the third header field(s), arranged to generate such value(s) that a hash value calculated using said value(s) and the third hash function is a hash value currently allocated to said node, and means 808 for communicating information about established secure tunnels, typically between nodes in a network element cluster. The third data packets are typically data packets relating to an IKE Phase II message exchange, and an example of the third header field(s) is the Message Identifier field in an ISAKMP header.

A node 800 according to the second embodiment of the invention may further comprise means 809 for filtering a plurality of fourth data packets, which are data packets in accordance with a protocol for establishing secure key management sessions, based on fourth packet-specific hash values. A fourth packet-specific hash value being calculated using a fourth hash function and at least fourth header field(s) of a fourth data packet, and said means 809 are arranged to accept only fourth data packets having one of the hash values currently allocated to said node. Furthermore, node 800 may comprise means 810 for generating value(s) for the fourth header field(s), arranged to generate such value(s) that a hash value calculated using said value(s) and the fourth hash function is a hash value currently allocated to said node. The fourth data packets are typically data packets relating to an IKE Phase I message exchange, and an example of the fourth header field(s) is the Initiator Cookie field in an ISAKMP header.

Furthermore, a node 800 according to the second embodiment of the invention may comprise means 811 for communicating information about established IKE SA or other similar secure key exchange session. This information is needed to carry out IKE Phase II negotiations. Typically node 800 comprises means 812 for receiving information about hash value reallocation, and it may also comprise means 813 for recovering lost secure tunnels. These means 813 typically comprise means for checking if there are established secure tunnels relating to reallocated hash values, arranged to operate after reallocation of hash values, means for deleting a secure tunnel relating to a reallocated hash value, and means for establishing a new secure tunnel to replace a deleted secure tunnel.

Figure 9A:
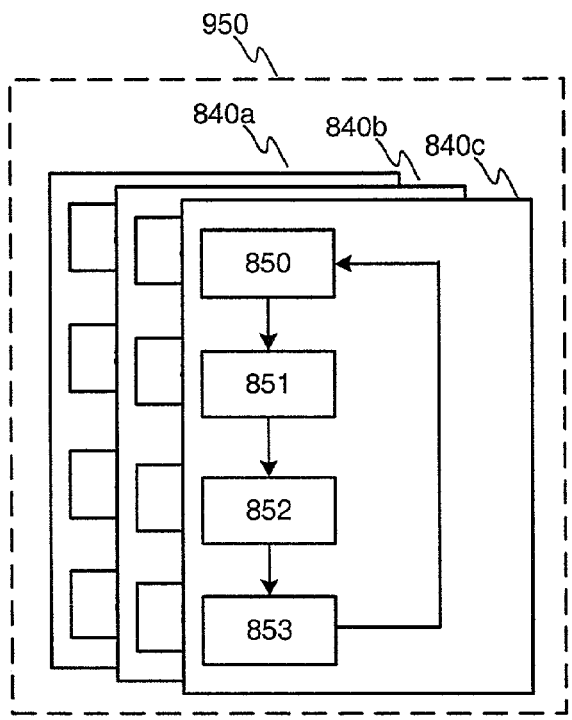
FIG. 9 illustrates schematically a network element cluster according to the invention.

FIG. 9A illustrates, as an example, a network element cluster 940 according to the invention for processing data packets. The network element cluster 940 comprises a plurality of nodes 840. Nodes 840 of the network element cluster 940 typically comprise means 850 for determining distribution decisions on the basis of certain field(s) of data packets according to predetermined criteria, means 851 for accepting data packets for processing according to the distribution decisions, and means 852 for processing data packets. Further nodes 840 comprise means 853 for selecting at least partly arbitrary value(s) for at least one of said certain field(s) of data packets. Typically means 853 are included in means 852. Further, means 853 for selecting are adapted to select such value(s) for at least one of said certain field(s) of a third data packet, that distribution decisions determined according to the predetermined criteria for a plurality of first data packets and a plurality of second data packets are the same, said pluralities of first and second data packets belonging to a first set of data packets and said third data packet being related to said first set of data packets.

Additionally or alternatively, means 853 for selecting may be adapted to provide at least partly arbitrarily selected value(s), and means 850 for determining distribution decisions may be adapted to adjust said predetermined criteria on the basis of said selected value(s) concerning a sixth data packet, so that said a plurality of fourth data packets and a plurality of fifth data packets result in the same distribution decision, said pluralities of fourth and fifth data packets belonging to a second set of data packets and said sixth data packet being related to said second set of data packets.

Figure 9B:
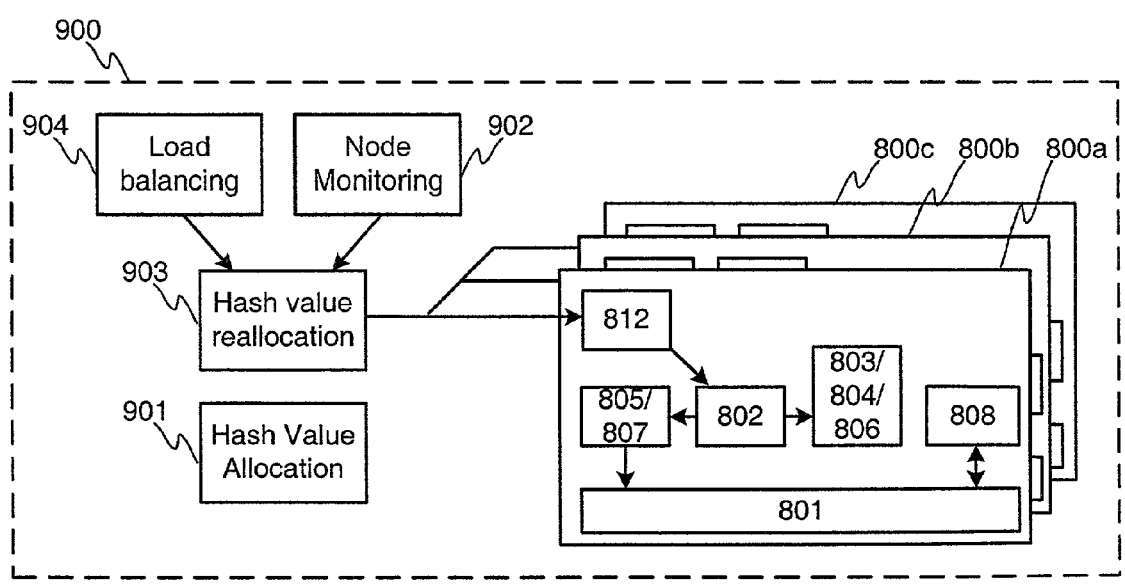

FIG. 9B illustrates, as an example, a network element cluster 900 according to the second embodiment of the invention for processing data packets. The network element cluster 900 comprises a plurality of nodes 800 (in FIG. 9 nodes 800a, 800b and 800c, as an example) and additionally means 901 for allocating a range of hash values to the nodes, so that each node has node-specific hash values, for example, after configuration. The network element cluster 900 typically comprises means 902 for monitoring the state of nodes belonging to said network element cluster, and means 903 for reallocating the range of hash values to nodes belonging to said network element cluster. In this case, nodes 800 typically comprise means 812 for receiving information about hash value reallocation and, furthermore, means 813 for recovering lost secure tunnels. A network element cluster 900 may further comprise means 904 for balancing load by reallocating hash values. The means 901, 902, 903 and 904 may be implemented, for example, in one of the nodes 800 of the network element cluster 900 or in a distributed way using typically all the nodes 800 of the network element cluster. Alternatively, they may be implemented, for example, using a computing device, which is separate from the nodes 800.

The means illustrated in FIGS. 8 and 9 are typically implemented using a suitable combination of software and hardware. Such hardware typically comprises at least processing means and memory means. Some of the means presented in FIG. 8 or 9 may be implemented as single means supporting the functionality of those means: for example means 803, 804, 806 and 809 may be implemented as single means. FIGS. 8 and 9 present only examples of how to divide the functionality of a node according to the invention or a network element cluster according to the invention into separate functional blocks.

In view of the foregoing description it will be evident to a person skilled in the art that various modifications may be made within the scope of the invention. While preferred embodiments of the invention have been described in detail, it should be apparent that many modifications and variations thereto are possible, all of which fall within the scope of the invention.

The invention claimed is:

1. A gateway node of a network element cluster, said gateway node having
    first means for processing data packets and establishing secure tunnel connections in accordance with a protocol suite for securing packet data communications,
    second means for storing hash values, which are currently allocated to said gateway node and different from hash values allocated to other gateway nodes in the cluster so as to enable load distribution,
    third means for filtering at least a plurality of data packets based on packet-specific first hash values, a first packet-specific hash value being calculated using a first hash function and first header field(s) of a data packet, said third means being arranged to accept only data packets having one of the hash values currently allocated to said node and to ignore other data packets,
    fourth means for filtering a plurality of second data packets, which are data packets of a secure tunnel according to a protocol suite for securing packet data communications, based on second packet-specific hash values, a second packet-specific hash value being calculated using a second hash function and at least second header field(s) of a second data packet, said fourth means being arranged to accept only second data packets having one of the hash values being currently allocated to said node and to ignore other data packets,
    fifth means for generating value(s) for the second header field(s), arranged to generate such value(s) that a hash value calculated using said value(s) and the second hash function is a hash value currently allocated to said node, and
    means for providing the second header field(s) of a second data packet outbound from the node with said generated value(s).

2. A node according to claim 1, further comprising:
    sixth means for filtering a plurality of third data packets, which are data packets in accordance with a protocol for establishing secure tunnel connections, based on third packet-specific hash values, a third packet-specific hash value being calculated using a third hash function and at least third header field(s) of a third data packet, said sixth means arranged to accept only third data packets having one of the hash values currently allocated to said node,
    seventh means for generating value(s) for the third header field(s), arranged to generate such value(s) that a hash value calculated using said value(s) and the third hash function is a hash value currently allocated to said node, and
    eighth means for communicating information about established secure tunnel connections.

3. A node according to claim 2, further comprising:
    ninth means for filtering a plurality of fourth data packets, which are data packets in accordance with a protocol for establishing secure key management sessions, based on fourth packet-specific hash values, a fourth packet-specific hash value being calculated using a fourth hash function and at least fourth header field(s) of a fourth data packet, said ninth means arranged to accept only fourth data packets having one of the hash values currently allocated to said node, and
    means for generating value(s) for the fourth header field(s), arranged to generate such value(s) that a hash value calculated using said value(s) and the fourth hash function is a hash value currently allocated to said node.

4. A network element cluster for processing data packets, said network element cluster comprising a plurality of gateway nodes, said network element cluster having means for allocating a range of hash values to the gateway nodes, so that each gateway node has node-specific hash values different from the hash values of other gateway nodes, and at least one of said gateway nodes comprises
    tunnel means for processing data packets and establishing secure tunnels connections in accordance with a protocol suite for securing packet data communications,
    storing means for storing hash values, which are currently allocated to said gateway node and different from the hash values allocated to other gateway nodes in the cluster so as to enable load distribution, and
    first means for filtering at least a plurality of data packets based on packet-specific first hash values, a first packet-specific hash value being calculated using a first hash function and first header field(s) of a data packet, said first means being arranged to accept only data packets having one of the hash values currently allocated to said gateway node and to ignore other data packets,
    second means for filtering a plurality of second data packets, which are data packets of a secure tunnel according to a protocol suite for securing packet data communications, based on second packet-specific hash values, a second packet-specific hash value being calculated using a second hash functions and second header field(s) of a second data packet, said second means being arranged to accept only second data packets having one of the hash values being currently allocated to said gateway node and to ignore other data packets, and
    third means for generating value(s) for the second header field(s), arranged to generate such value(s) that a hash value calculated using said value(s) and the second hash function is a hash value currently allocated to said gateway node, and means for providing the second header field(s) of a second data packet outbound from the gateway node with said generated value(s).

5. A network element cluster according to claim 4, wherein said at least one of said gateway nodes further comprises:
  fourth means for filtering a plurality of third data packets, which are data packets in accordance with a protocol for establishing secure tunnel connections, based on third packet-specific hash values, a third packet-specific hash value being calculated using a third hash function and third header field(s) of a third data packet, said fourth means arranged to accept only third data packets having one of the hash a values currently allocated to said gateway node,
  fifth means for generating value(s) for the third header field(s), arranged to generate such value(s) that a hash value calculated using said value(s) and the third hash function is a hash value currently allocated to said gateway node, and
  sixth means for communicating information about established secure tunnel connections.

6. A network element cluster according to claim 4, further comprising:
  fourth means for monitoring the state of gateway nodes belonging to said network element cluster, and
  fifth means for reallocating the range of hash values to gateway nodes belonging to said network element cluster.

7. A network element cluster according to claim 4, wherein said at least one gateway node further comprises
  fourth means for checking if there are established secure tunnel connections relating to reallocated hash values, arranged to operate after reallocation of hash values,
  fifth means for deleting a secure tunnel relating to a reallocated hash value, and
  sixth means for establishing a new secure tunnel to replace a deleted secure tunnel.

8. A method of processing data packets in a gateway node of a network element cluster, comprising
  processing data packets and establishing secure tunnel connections in accordance with a protocol suite for securing packet data communications,
  storing hash values, which are currently allocated to a gateway node and different from hash values allocated to other gateway nodes in the cluster so as to enable load distribution,
  filtering at least a plurality of data packets based on packet-specific first hash values, a first packet-specific hash value being calculated using a first hash function and first header field(s) of a data packet, and accepting only data packets having one of the hash values currently allocated to said gateway node and ignoring other data packets,
  filtering a plurality of second data packets, which are data packets of a secure tunnel according to a protocol suite for securing packet data communications, based on second packet-specific hash values, a second packet-specific hash value being calculated using a second hash functions and at least second header field(s) of a second data packet, and accepting only second data packets having one of said hash values being currently allocated to said gateway node and ignoring other data packets, and
  generating value(s) for the second header field(s), arranged to generate such value(s) that a hash value calculated using said value(s) and the second hash function is a hash value currently allocated to said gateway node and
  providing the second header field(s) of a second data packet outbound from the gateway node with said generated value(s).

9. A method of processing data packets in a network element cluster comprised of a plurality of gateway nodes, said method comprising:
  allocating a range of hash values to the gateway nodes of a network element cluster, so that each gaeway node has node-specific hash values different from hash values of other ones of said plurality of gateway nodes,
  processing data packets and establishing secure tunnel connections in accordance with a protocol suite for securing packet data communications,
  storing hash values, which are currently allocated to said gateway node and different from the hash values allocated to other ones of said plurality of gateway nodes in said network element cluster so as to enable load distribution, and
  filtering at least a plurality of data packets based on packet-specific first hash values, a first packet-specific hash value being calculated using a first hash function and first header field(s) of a data packet, and accepting only data packets having one of the hash values currently allocated to said gateway node and ignoring other data packets,
  filtering a plurality of second data packets, which are data packets of secure tunnel according to a protocol suite for securing packet data communications, based on second packet-specific hash values, a second packet-specific hash value being calculated using a second hash function and second header field(s) of a second data packet, and accepting only second data packets having one of the hash values being currently allocated to said gateway node ignoring other data packets,
  generating value(s) for the second header field(s), arranged to generate such value(s) that a hash value calculated using said value(s) and the second hash function is a hash value currently allocated to said gateway node, and
  providing the second header field(s) of a second data packet outbound from the gateway node with said generated value(s).

10. A computer readable storage medium having encoded thereon computer executable program code which, when executed on a gateway node in a network, causes said gateway node to
  process data packets and establish secure tunnel connections in accordance with a protocol suite for securing packet data communications,
  store hash values, which are currently allocated to a gateway node and different from hash values allocated to other gateway nodes in a cluster of nodes so as to enable load distribution,
  filter at least a plurality of data packets based on packet-specific first hash values, a first packet-specific hash value being calculated using a first hash function and first header field(s) of a data packet, and accepting only data packets having one of the hash values currently allocated to said gateway node and ignoring other data packets,
  filter a plurality of second data packets, which are data packets of secure tunnel according to a protocol suite for securing packet data communications, based on second packet-specific hash values, a second packet-specific hash value being calculated using a second hash function and at least second header field(s) of a second data packet, and accepting only second data packets having one of the hash values being currently allocated to said gateway node and ignoring other data packets, generate value(s) for the second header field(s), arranged to generate such value(s) that a hash value calculated using said value(s) and the second hash function is a hash value currently allocated to said gateway node, and provide the second header fields(s) of a second data packet outbound from the gateway node with said generated value(s).

11. A computer readable storage medium having encoded thereon computer executable program code which, when executed on a gateway node in a network, causes said gateway node to allocate a range of hash values to a gateway node, so that each node has node-specific hash values different from hash values allocated to other gateway nodes in said cluster so as to enable load distribution, process data packets and establish secure tunnel connections in accordance with a protocol suite for securing packet data communications, store hash values, which are currently allocated to said node, and filter at least a plurality of data packets based on packet-specific first hash values, a first packet-specific hash value being calculated using a first hash function and first header field(s) of a data packet, and accepting only data packets having one of the hash values currently allocated to said gateway node and ignoring other data packets, filter a plurality of second data packets, which are data packets of secure tunnel according to a protocol suite for securing packet data communications, based on second packet-specific hash values, a second packet-specific hash value being calculated using a second hash function and second header field(s) of a second data packet, and accepting only second data packets having one of the hash values being currently allocated to said gateway node and ignoring other data packets, generate value(s) for the second header field(s), arranged to generate such value(s) that a hash value calculated using said value(s) and the second hash function is a hash value currently allocated to said gateway node.

12. A gateway node of a network element cluster, wherein:

said gateway node is configured to process data packets and establish secure tunnel connection in accordance with a protocol suite for securing packet data communications;

said gateway node is configured to store hash values, which are currently allocated to said gateway node and different from hash values allocated to other gateway nodes in the cluster so as to enable load distribution;

said gateway node is configured to filter at least a plurality of data packets based on packet-specific first hash values, a first packet-specific hash value being calculated using a first hash function and first header field(s) of a data packet, and to accept only data packets having one of the hash values currently allocated to said node and to ignore other data packets;

said gateway node is configured to filter a plurality of second data packets, which are data packets of a secure tunnel according to a protocol suite for securing packet data communications, based on second packet-specific hash values, a second packet-specific hash value being calculated using a second hash function and at least second header field(s) of a second data packet, and to accept only second data packets having one of the hash values being currently allocated to said node and to ignore other data packets;

said gateway node is configured to generate value(s) for the second header field(s), arranged to generate such value(s) that a hash value calculated using said value(s) and the second hash function is a hash value currently allocated to said node, and said gateway node is configured to provide the second header field(s) of a second data packet outbound from the node with said generated value(s).

* * * * *